US011982260B2

(12) United States Patent
Ma

(10) Patent No.: US 11,982,260 B2
(45) Date of Patent: May 14, 2024

(54) GENERATOR, HEAT EXCHANGE DEVICE FOR SHAFT SYSTEM THEREOF, AND WIND TURBINE

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 576 days.

(21) Appl. No.: 17/272,065

(22) PCT Filed: Aug. 29, 2019

(86) PCT No.: PCT/CN2019/103272
§ 371 (c)(1),
(2) Date: Feb. 26, 2021

(87) PCT Pub. No.: WO2020/043159
PCT Pub. Date: Mar. 5, 2020

(65) Prior Publication Data
US 2021/0324836 A1    Oct. 21, 2021

(30) Foreign Application Priority Data

Aug. 31, 2018  (CN) .......................... 201811014796.0

(51) Int. Cl.
*H02K 9/12*    (2006.01)
*F03D 9/25*    (2016.01)
(Continued)

(52) U.S. Cl.
CPC .............. *F03D 80/60* (2016.05); *F03D 9/25* (2016.05); *H02K 7/1838* (2013.01); *H02K 9/12* (2013.01); *H02K 9/193* (2013.01)

(58) Field of Classification Search
CPC .. H02K 9/00; H02K 9/10; H02K 9/12; H02K 9/19; H02K 9/193; H02K 9/22;
(Continued)

(56) References Cited

U.S. PATENT DOCUMENTS

| 4,818,178 A | 4/1989 | Sibbertsen |
| 4,871,923 A | 10/1989 | Scholz et al. |

(Continued)

FOREIGN PATENT DOCUMENTS

| CN | 87101766 A | 10/1987 |
| CN | 1626996 A | 6/2005 |

(Continued)

OTHER PUBLICATIONS

Extended European Search Report in correspondence European Application No. 19853804.3 dated Sep. 24, 2021 (13 pages).

(Continued)

*Primary Examiner* — Tran N Nguyen
(74) *Attorney, Agent, or Firm* — Bayes PLLC

(57) ABSTRACT

A generator, a heat exchange device for a shaft system thereof, and a wind turbine are provided. The heat exchange device includes a flexible cavity for allowing a cooling medium to input. The flexible cavity is located on an inner wall of the generator rotation shaft, and is cooled by a generator bearing in the generator shaft system. After the cooling medium is injected into the flexible cavity, the cooling environment can be created at the inner wall position of the generator rotation shaft so as to provide a heat-dissipation channel for the generator bearing enclosed (Continued)

between the generator rotation shaft and a generator fixed shaft, thereby achieving good cooling effect.

20 Claims, 12 Drawing Sheets

(51) Int. Cl.
*F03D 80/60* (2016.01)
*H02K 7/18* (2006.01)
*H02K 9/19* (2006.01)
*H02K 9/193* (2006.01)

(58) Field of Classification Search
CPC .......... H02K 9/223; H02K 9/227; H02K 7/00; H02K 7/18; H02K 7/1838; H02K 5/00; H02K 5/20; F03D 80/60; F03D 9/00; F03D 9/25

See application file for complete search history.

(56) References Cited

U.S. PATENT DOCUMENTS

| | | |
|---|---|---|
| 9,017,440 B2 | 4/2015 | Yao et al. |
| 2002/0043881 A1 | 4/2002 | Asao |
| 2008/0250765 A1 | 10/2008 | Lane et al. |
| 2011/0236193 A1 | 9/2011 | Chriss et al. |
| 2012/0282096 A1 | 11/2012 | Eriksen et al. |
| 2016/0380248 A1* | 12/2016 | Haer .................. B04C 3/06 55/327 |

FOREIGN PATENT DOCUMENTS

| | | | |
|---|---|---|---|
| CN | 101252980 | A | 8/2008 |
| CN | 102767479 | A | 11/2012 |
| CN | 103143456 | A | 6/2013 |
| CN | 104713277 | A | 6/2015 |
| CN | 105526268 | A | 4/2016 |
| CN | 205207057 | U | 5/2016 |
| CN | 105736258 | A | 7/2016 |
| CN | 107044390 | A | 8/2017 |
| CN | 107842472 | A | 3/2018 |
| CN | 108050023 | A | 5/2018 |
| DE | 3625840 | A1 | 2/1988 |
| DE | 112010004773 | T5 * | 10/2012 |
| EP | 1541943 | A2 | 6/2005 |
| EP | 1717468 | A1 | 11/2006 |
| EP | 3222849 | A1 | 9/2017 |
| JP | S56139368 | U | 10/1981 |
| SU | 143882 | A1 | 11/1961 |

OTHER PUBLICATIONS

International Search Report in correspondence PCT Application No. PCT/CN2019/103272 dated Dec. 3, 2019 (13 pages).

* cited by examiner

GENERATOR, HEAT EXCHANGE DEVICE FOR SHAFT SYSTEM THEREOF, AND WIND TURBINE

The present application claims the priority to Chinese Patent Application No. 201811014796.0, titled "GENERATOR, HEAT EXCHANGE DEVICE FOR SHAFT SYSTEM THEREOF, AND WIND TURBINE", filed with the China National intellectual Property Administration on Aug. 31, 2018, which is incorporated herein by reference in its entirety.

FIELD

The present application relates to the technical field of electrical equipment cooling, and in particular to a generator, a heat exchange device for a shaft system of the generator, and a wind turbine.

BACKGROUND

Referring to FIGS. 1 and 2, FIG. 1 is a schematic view of an overall layout of a whole machine in which an inside of a generator is cooled by an air surface heat exchanger; and FIG. 2 is an exploded schematic view showing the structure of the surface heat exchanger in FIG. 1.

As shown in FIG. 1, one side of the generator 500' (the right side as shown in FIG. 1) is connected to a rotor 600', and the other side (the left side as shown in FIG. 1) is provided with a nacelle 100', and a surface heat exchanger 300' is arranged in the nacelle 100', specifically at a tail of the nacelle 100'. An internal circulation induced draft fan 202' is provided at the left side of the surface heat exchanger 300', and the internal circulation induced draft fan 202' is driven by an internal circulation driving motor 201'. A drawing and conveying pipe for the internal circulation airflow 400' is further provided. The hot airflow generated by the generator 500' enters, under the action of the internal circulation induced draft fan 202', into the heat exchanger core of the surface type heat exchanger 300' through the drawing and conveying pipe for the internal circulation airflow 400'.

The surface heat exchanger 300' is further provided with an external circulation induced draft fan 102', and the external circulation induced draft fan 102' is driven by an external circulation driving motor 101'. The external circulation induced draft fan 102' introduces the natural ambient airflow into the heat exchange core of the surface heat exchanger 300', and the external circulation airflow after heat exchange flows out of the nacelle 100'. An external circulation air outlet 103' connected to the outside is shown in FIG. 1. The internal circulation airflow is cooled and discharged out of the surface heat exchanger 300', and then diffused inside the tail of the nacelle 100' at 360 degrees.

In FIG. 2, when the internal circulation airflow is introduced, an internal circulation confluence chamber 203' is further provided between the surface heat exchanger 300' and the drawing and conveying pipe for the internal circulation airflow 400', and internal circulation airflow confluence inlets 203a' are provided at both an upper side and a lower side. An inlet connecting section 104' of the external circulation induced draft fan is arranged between the external circulation induced draft fan 102' and the surface heat exchanger 300', and an inlet connecting section 204' of the internal circulation induced draft fan is arranged between the internal circulation induced draft fan 202' and the surface heat exchanger 300'.

In FIG. 1, a cooling airflow inlet orifice plate 500a' is provided at a housing of the generator 500', which can be understood with reference to FIG. 3. FIG. 3 is a schematic view showing the cooling airflow inlet orifice plate 500a' in FIG. 1.

The internal circulation airflow which is cooled by being diffused in the nacelle may enter the generator 500' through an inlet hole 500b' of the cooling airflow inlet orifice plate 500a' and be reused as cooling airflow to cool the iron core of the generator 500'.

As shown in FIG. 1, a generator bearing is arranged between the generator fixed shaft and the generator rotating shaft of the generator 500'. The generator bearing may generate a lot of heat during operation, however, since the generator bearing is surrounded by the generator fixed shaft and the generator rotating shaft, the heat is difficult to be dissipated.

Moreover, the above solution mainly cools the iron core of the generator 500', and there are no suitable solutions for cooling the shaft system of the generator and hub.

SUMMARY

An object of the present application is to provide a heat exchange device for a generator shaft system with a better cooling effect.

A heat exchange device for a generator shaft system is provided according to the present application. The generator shaft system includes a generator rotating shaft, a generator fixed shaft and a generator bearing arranged between the generator rotating shaft and the generator fixed shaft. The heat exchange device includes a flexible chamber, wherein a cooling medium can be introduced into the flexible chamber, and the flexible chamber is located on an inner wall of the generator rotating shaft, or the flexible chamber is located at an end of the generator fixed shaft which is connected to the generator bearing.

After the cooling medium is injected into the flexible chamber, a cooling environment can be built at the inner wall of the generator rotating shaft, thus providing a heat dissipation way for the generator bearing enclosed between the generator rotating shaft and the generator fixed shaft, which performs a better cooling function.

A wind turbine is further provided according to the present application. The wind turbine includes a generator, and the generator includes a rotor, a stator and a generator shaft system; and the wind turbine further includes the heat exchange device for the generator shaft system according to any one of the embodiments of the present application.

A generator is further provided according to the present application, including the generator shaft system, and further including the heat exchange device for the generator shaft system according to any one of the embodiments of the present application.

The wind turbine and the generator, including the heat exchange device for the generator shaft system, have the same technical effect.

Figure 1:
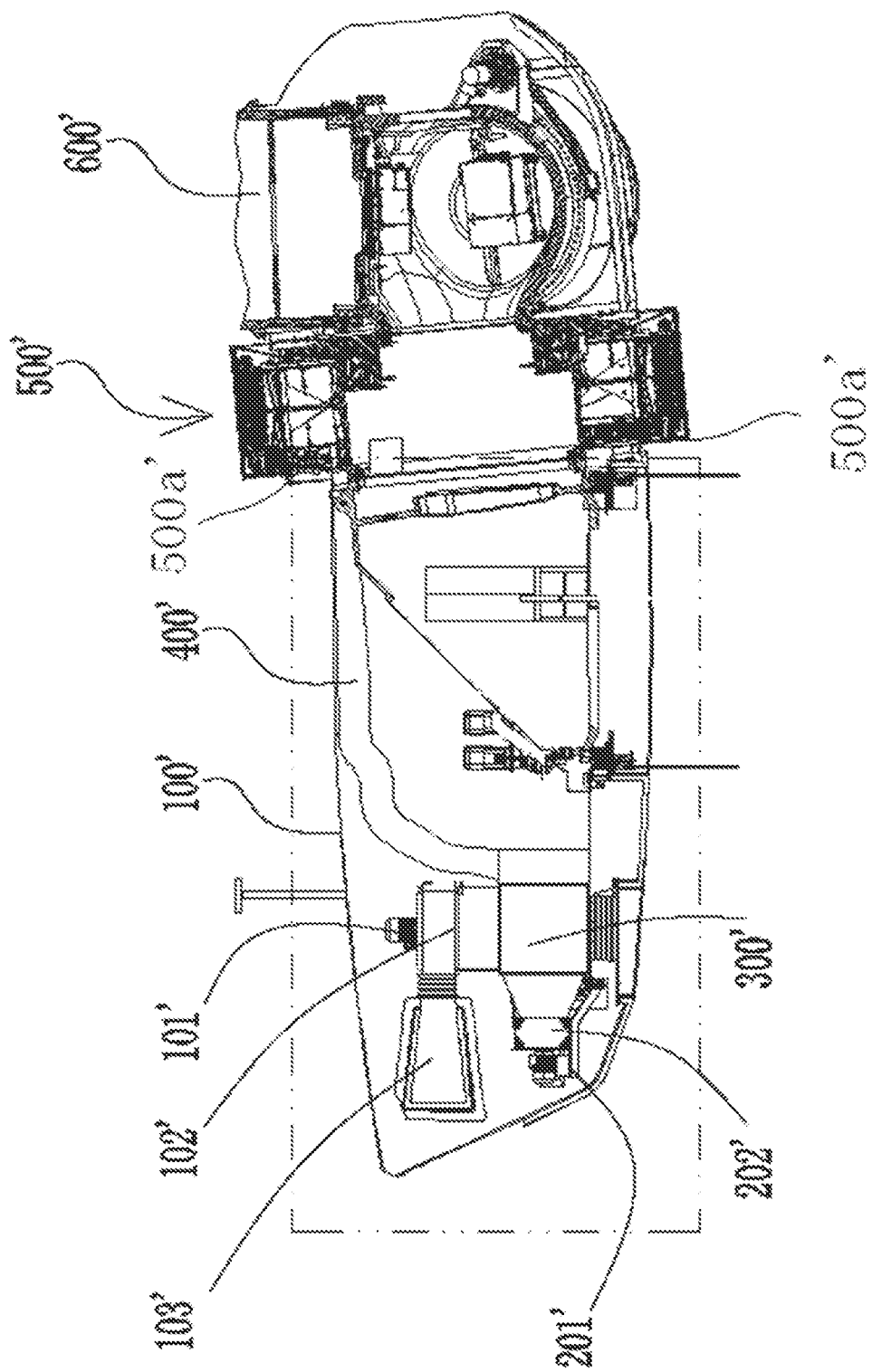
FIG. 1 is a schematic view of an overall layout of a whole machine in which an inside of a generator is cooled by an air surface heat exchanger.
Figure 2:
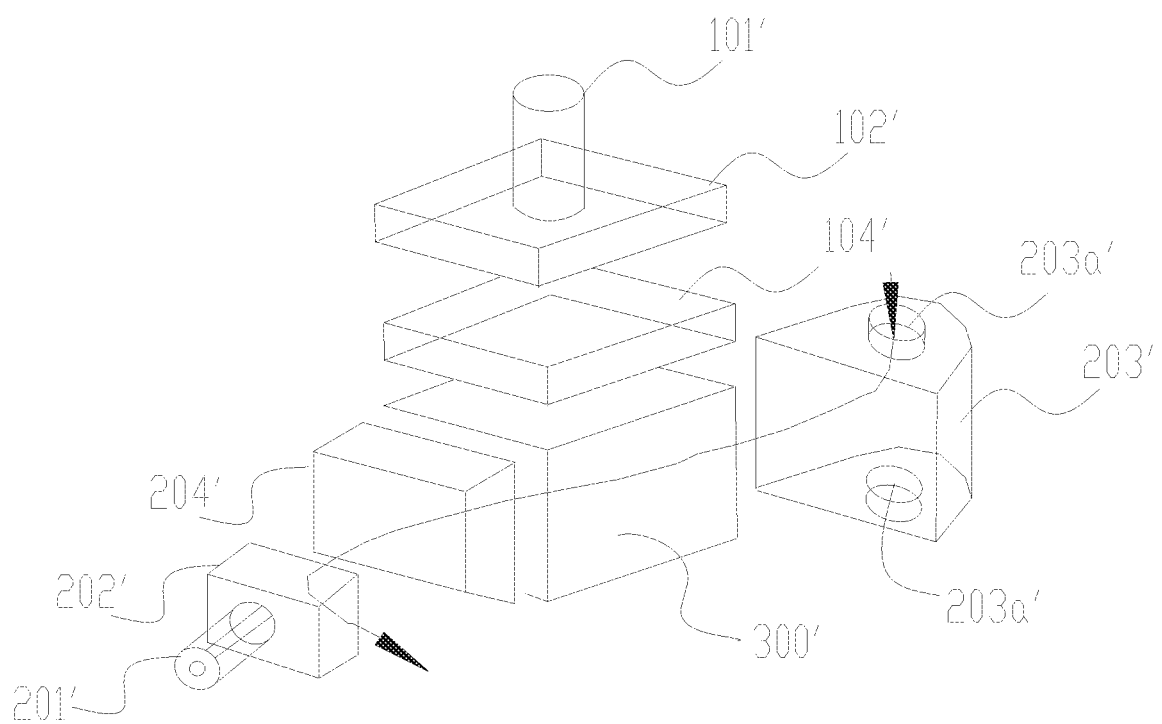
FIG. 2 is an exploded schematic view showing the structure of the surface heat exchanger in FIG. 1.
Figure 3:
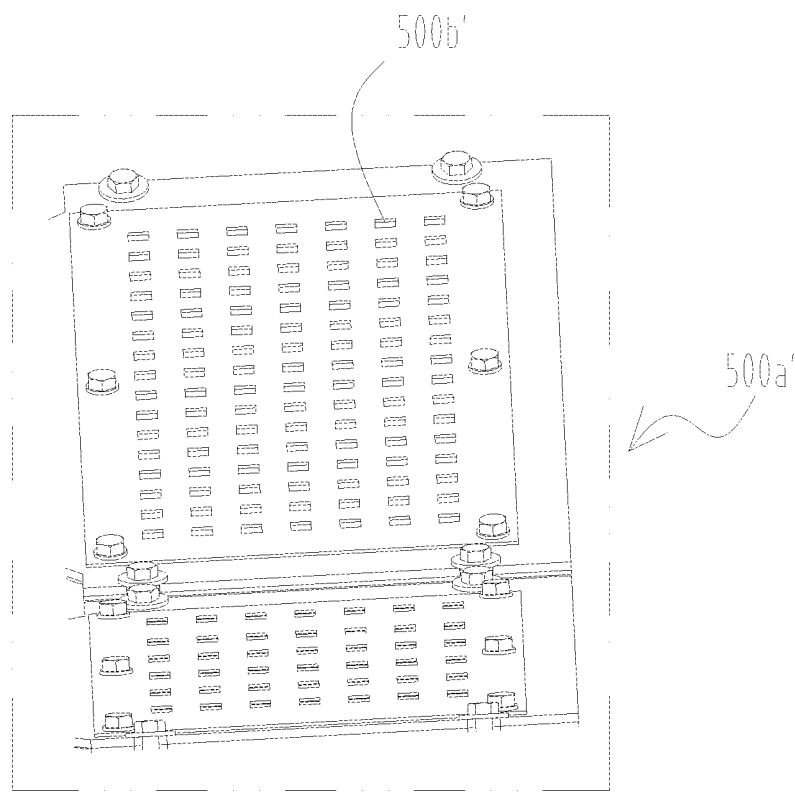
FIG. 3 is a schematic view showing a cooling air inlet orifice plate in FIG. 1.

Reference numerals in FIGS. 1 to 3 are as follows:
100' nacelle,
101' external circulation driving motor,
102' external circulation induced draft fan,
103' external circulation air outlet,
104' inlet connecting section of external circulation induced draft fan,
201' internal circulation driving motor,
202' internal circulation induced draft fan,
203' internal circulation confluence chamber,
204' inlet connecting section of internal circulation induced draft fan,
300' surface heat exchanger,
400' drawing and conveying pipe for internal circulation airflow,
500' generator,
500a' cooling airflow inlet orifice plate,
500b' inlet hole,
600' rotor.

Reference numerals in FIGS. 4 to 14 are as follows:
100 nacelle,
1001 base,
1001a bottom plate,
1002 wind gauge support,
1003 yaw motor,
1004 fixed support,
200 generator,
201 electric machine fixed shaft,
202 generator rotating shaft,
202a brake ring,
202b rotary portion,
202c annular protrusion,
203 generator bearing,
204 iron core,
205 cooling gas flow inlet orifice plate,
300 surface heat exchanger,
301 driving motor of internal circulation induced draft fan,
302 internal circulation induced draft fan,
303 driving motor of external circulation induced draft fan,
304 external circulation induced draft fan,
305 air discharge port of external circulation induced draft fan,
400 conveying pipe,
500 hub,
501 pitch bearing,
502 servo motor,
503 servo controller,
600 tower of wind turbine,
700 blade,
10 vortex separator,
101 vortex separation tube,
101a vortex chamber,
101a1 end plate,
101a2 through hole,
101b hot end pipe section,
101c cold end pipe section,
101d cold end,
101e hot end,
102 jet pipe,
103 throttling member,
20 flexible chamber,
20a valve core,
30 limiting ring,
30a expansion hoop,
40 frequency converter of driving motor of induced draft fan,
50 pneumatic slip ring,
50a input pipe,
50b output pipe,
60 gas-liquid separator,
601 concave top lid,
601a protrusion,
602 inlet end,
603 separation cylinder,
603a grille,
603b protrusion,
603c recession,
604 water guide blade grid,
70 compressor,
80 yaw bearing,
90 fixed support.

DETAILED DESCRIPTION OF THE EMBODIMENTS

For those skilled in the art to better understand technical solutions of the present application, the present application will be further described in detail below with reference to the drawings and specific embodiments.

Figure 4:
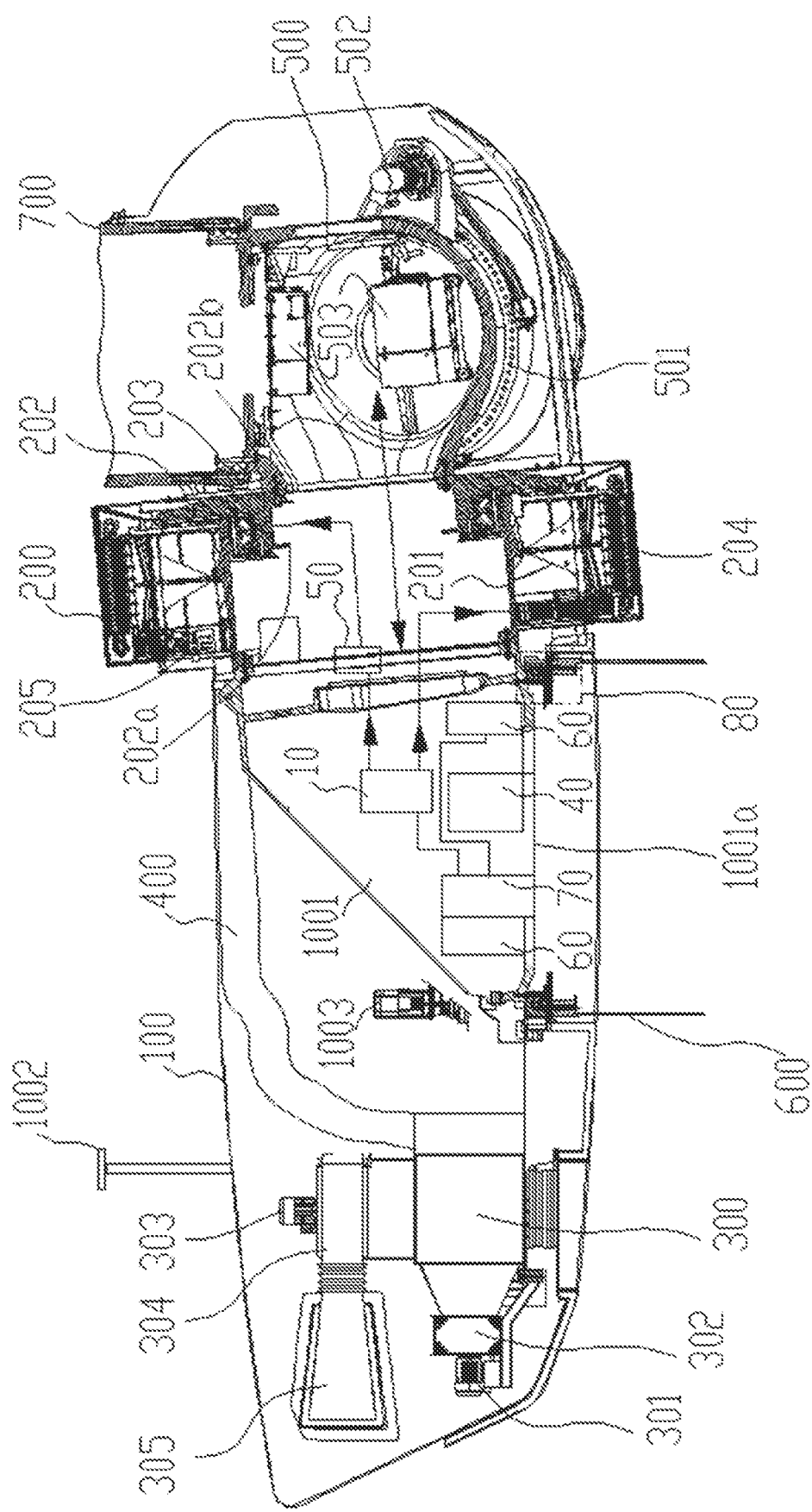
FIG. 4 is a schematic view showing a specific embodiment of a power generation equipment according to the present application.
Figure 5:
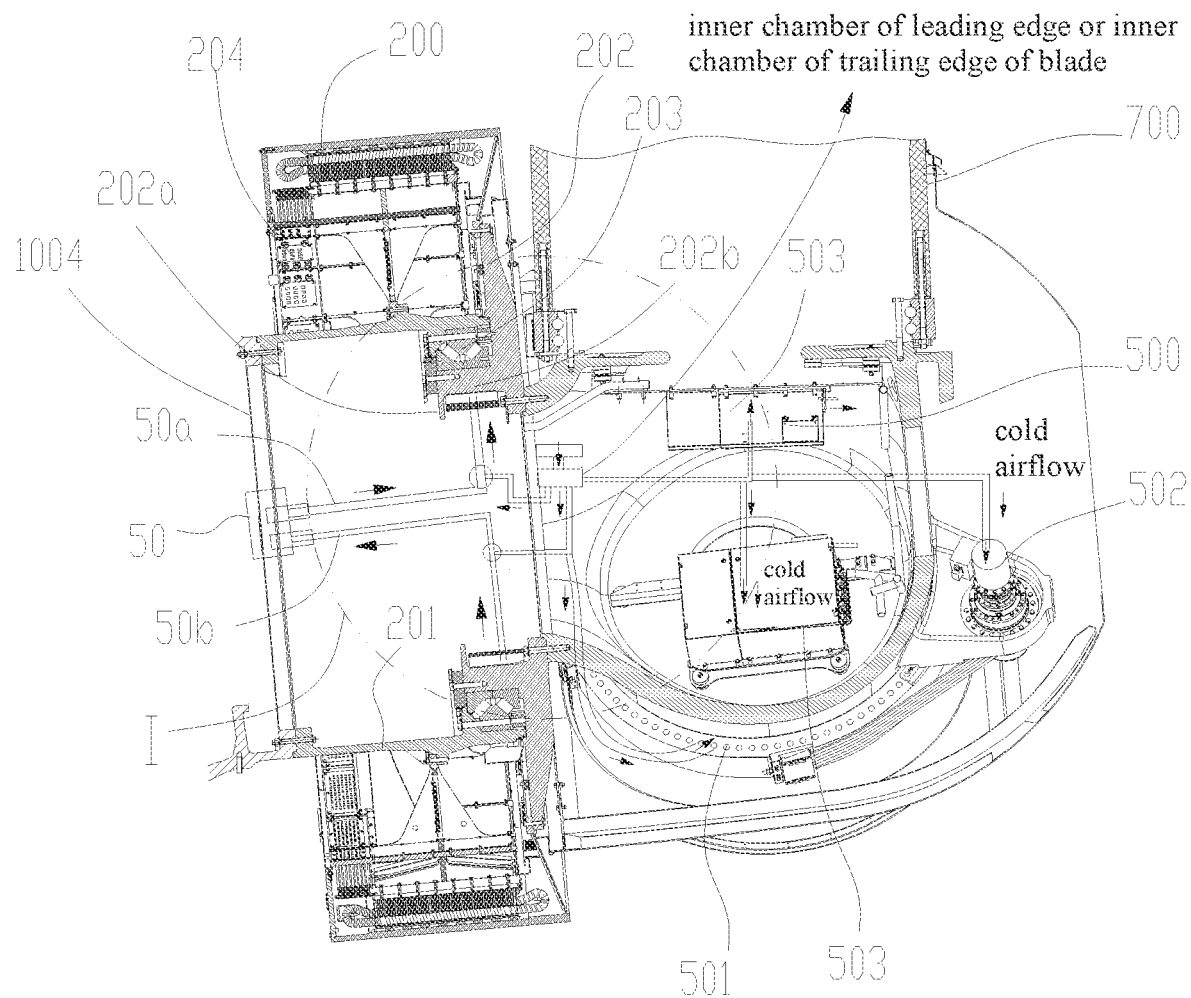
FIG. 5 is a schematic view showing a generator in FIG. 4, in which the internal structure is shown.
Figure 6:
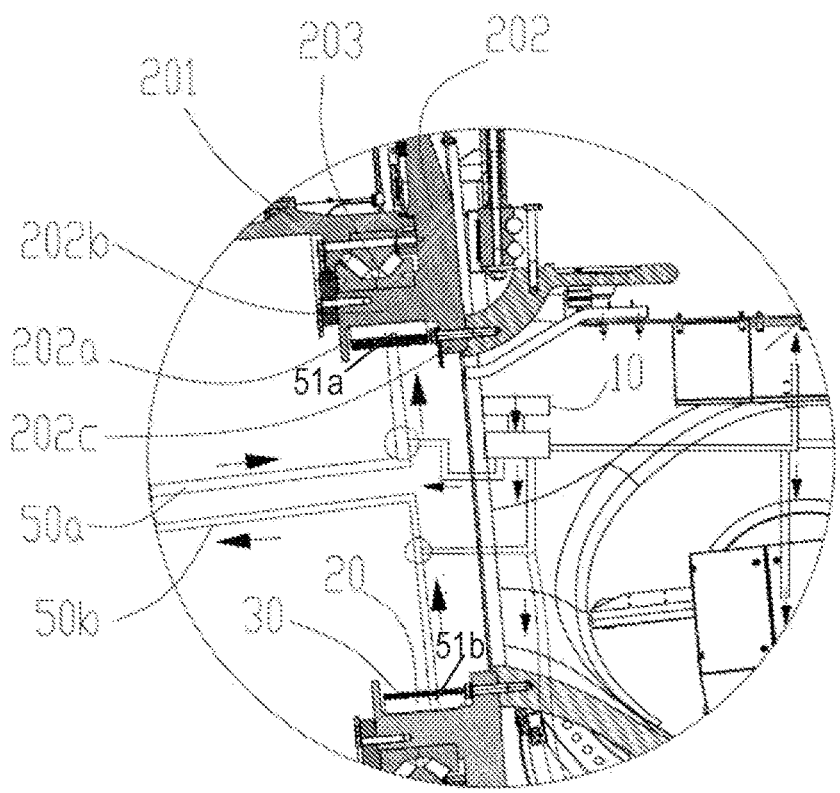
FIG. 6 is a partially enlarged schematic view showing a portion I in FIG. 5.
Figure 6A:
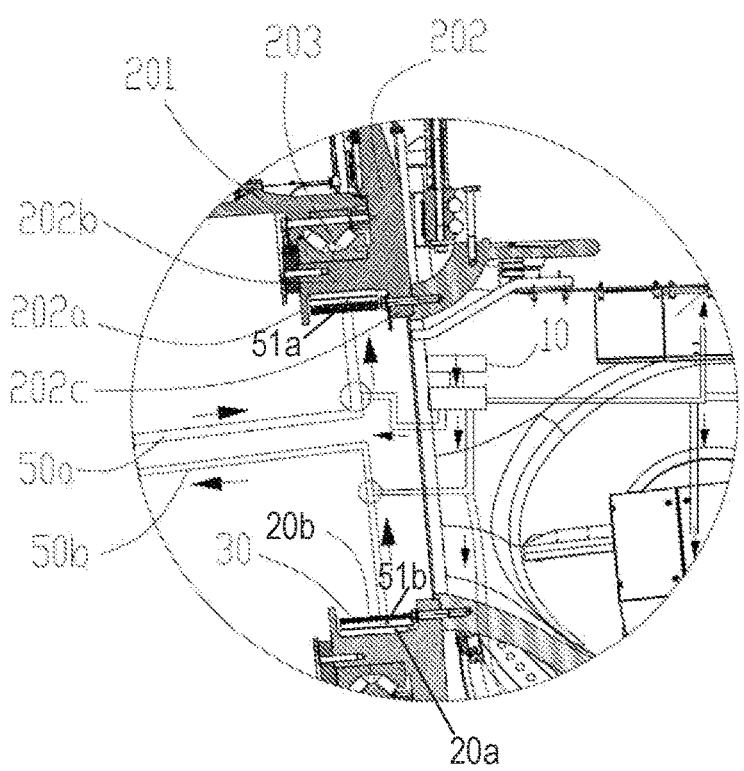
FIG. 6A is another partially enlarged schematic view showing the portion I in FIG. 5.

Referring to FIGS. 4 to 6, FIG. 4 is a schematic view showing a specific embodiment of power generation equipment according to the present application; FIG. 5 is a schematic view showing a generator in FIG. 4, in which the internal structure is shown; and FIG. 6 is a partially enlarged view showing a portion I in FIG. 5.

In this embodiment, taking wind power generation equipment as an example, the wind power generation equipment includes a generator 200, one end of the generator 200 is provided with a nacelle 100, and another end is provided with a hub 500 and blades. As shown in FIG. 5, the generator 200 includes a generator fixed shaft 201, and the generator fixed shaft is cylinder-shaped, and directly or indirectly carries iron core 204, windings, yokes, magnetic poles and other components. A generator bearing 203 of a generator shaft system is arranged between the generator fixed shaft 201 and a generator rotating shaft 202, so that the generator rotating shaft 202 can rotate relative to the generator fixed shaft 201. In this application, the shaft system includes the generator fixed shaft 201, the generator rotating shaft 202 and the generator bearing 203 arranged between the generator rotating shaft 202 and the generator fixed shaft 201.

Figure 7:
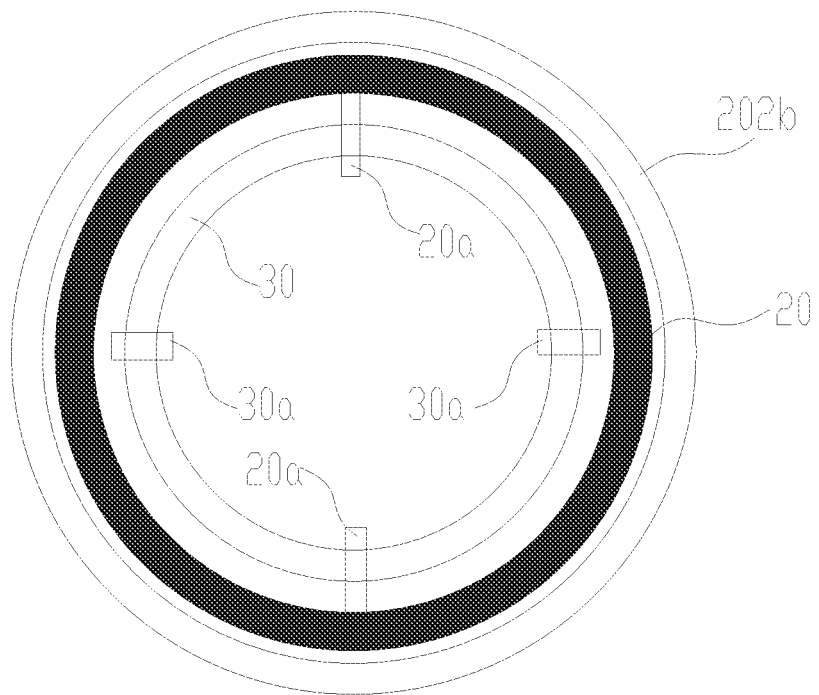
FIG. 7 is a schematic view showing that a flexible chamber and a limiting ring in FIG. 5 are mounted on a rotary portion of a generator rotating shaft.

Referring to FIG. 5 in conjunction with FIG. 7, FIG. 7 is a schematic view showing that a flexible chamber 20 and a limiting ring 30 in FIG. 5 are mounted on a rotary portion 202b of the generator rotating shaft 202.

The heat exchange device of the generator shaft system includes a flexible chamber 20 into which a cooling medium can be inputted. The flexible chamber 20 is located on an inner wall of the generator rotating shaft 202, specifically on an inner wall of the rotary portion 202b of the generator rotating shaft 202. The rotary portion 202b where the flexible chamber 20 is located is a portion of the generator rotating shaft 202 extending into the generator fixed shaft 201. In this way, the flexible chamber 20 can be located near an outer ring or an inner ring of the generator bearing, so as to absorb frictional heat in the bearing via a shortest path. The generator rotating shaft 202 is of a cylindrical shape (the rotary portion 202b is a part of the cylindrical shape) and has an annular inner wall, and correspondingly, the flexible chamber 20 in this embodiment is annular-shaped.

The flexible chamber 20 may be in direct contact with the inner wall of the generator rotating shaft 202, and may also be in indirect contact with the inner wall of the generator rotating shaft 202. For example, a heat conducting gasket is arranged between the flexible chamber 20 and the inner wall of the generator rotating shaft 202, so that the flexible chamber 20 is in indirect and close contact with the inner wall of the generator rotating shaft 202. The specific material of the heat conducting gasket may refer to the prior art.

Of course, the flexible chamber 20 may also be located at an end of the generator fixed shaft 201 which is connected to the generator bearing 203.

The heat exchange device further includes a limiting ring 30 made of a hard material, and the limiting ring 30 is located at an inner side of the annular flexible chamber 20. In a case that the flexible chamber 20 is filled with the cooling medium, the limiting ring 30 supports the flexible chamber 20. In this way, the rotary portion 202b, the limiting ring 30 and the flexible chamber 20 form a structure similar to a tire. When the flexible chamber 20 is being filled with the cooling medium, the flexible chamber 20 expands, and the limiting ring 30 limits inward expansion (toward an axis) of the flexible chamber 20, wherein "inward" means toward a circle center of the flexible chamber 20 and the rotary portion 202b of the generator rotating shaft 202. In this way, the limiting ring 30 defines a boundary of the inward expansion of the flexible chamber 20, and the flexible chamber 20 can only expand outward, to gradually approach the annular inner wall of the rotary portion 202b of the generator rotating shaft 202, and finally be able to abut against the annular inner wall. In this case, it is equivalent to providing a cold belt attached to the inner wall of the generator rotating shaft 202, thus the heat of the generator bearing 203 can be transferred to the generator rotating shaft 202, to perform heat exchange with the flexible chamber 20, so as to realize cooling. That is, after the flexible chamber 20 is filled with the cooling medium, a cooling environment is built at the inner wall of the generator rotating shaft 202, thus providing a heat dissipation channel for the generator bearing 203 located between the generator rotating shaft 202 and the generator fixed shaft 201, and thereby performing a good heat dissipation effect on the generator bearing 203. Of course, the generator fixed shaft 201 and the generator rotating shaft 202 are also cooled accordingly.

It can be understood that the limiting ring 30 may not be provided, and when the flexible chamber 20 expands to a certain extent, it will also be in contact with the inner wall of the generator rotating shaft 202, to perform the functions of heat exchange and cooling. Of course, in a case that the limiting ring 30 is provided, it can be further ensured that the flexible chamber 20 expands and be attached to the inner wall of the generator rotating shaft 202, which ensures an adhering area, that is, increases a heat exchange area. In addition, when the cooling medium is no longer introduced into the flexible chamber 20, the limiting ring 30 can support the flexible chamber 20 to keep it at the required position. In the case that the limiting ring 30 is not provided, the flexible chamber 20 can be adhered to the inner wall of the generator rotating shaft 202.

Besides, the flexible chamber 20 is not limited to a complete annular shape, for example, it may be formed by splicing multiple arc segments, or it may include two or more arc segments arranged at intervals. Of course, the complete annular flexible chamber 20 may be well adapted to the annular inner wall of the generator rotating shaft 202, which increases the heat exchange area and facilitates the introduction of the cooling medium.

According to the above description, the limiting ring 30 is configured to support and limit the flexible chamber 20, so it is made of the hard material, and the hard material herein is not specifically limited, as long as it has certain rigidity and is not easily deformed. For example, the limiting ring 30 may be a plastic ring or a steel ring or the like.

With continued reference to FIG. 7, the limiting ring 30 is formed by splicing two semicircular limiting annular segments in a circumferential direction. At each of splicing positions, an expansion hoop 30a is used to connect the two limiting annular segments. When being used for connection, the expansion hoop 30a can generate upward and downward forces, so as to bear against the upper limiting annular segment to press the flexible chamber 20 upward, and bear against the lower limiting annular segment to press the flexible chamber 20 upward, which further ensures that the flexible chamber 20 can be attached to the inner wall of the generator rotating shaft 202 by a larger area.

It is conceivable that the limiting ring 30 is not limited to the two semicircular limiting annular segments, instead, the limiting ring 30 may also be formed by splicing two or more limiting annular segments in the circumferential direction, and the splicing positions are connected through the expansion hoops 30a, which having the functions as described above, and will not be described again.

Regardless of whether the limiting ring 30 is provided or not, an outer wall of the flexible chamber 20 may be provided with an adhesive surface configured to be adhered to the annular inner wall of the generator rotating shaft 202. The adhesive surface may be applied with an adhesive, to directly realize adhesion; or, the adhesive surface may be provided with double sided adhesive tape, to realize adhesion. That is, the flexible chamber 20 is adhered and fixed to the inner wall of the generator rotating shaft 202, to be in direct and close contact with the inner wall of the generator rotating shaft 202.

With continued reference to FIG. 6, an edge of one end, facing the generator 200, of the rotary portion 202b of the generator rotating shaft 202 is provided with a brake ring 202a extending inward, and another end of the generator rotating shaft 202 opposite to the rotary portion 202b extends inward to form an annular protrusion 202c. It can be seen from FIG. 6 that, a U-shaped groove is defined by the inner wall of the rotary portion 202b, the brake ring 202a and the annular protrusion 202c. The flexible chamber 20 is located in the U-shaped groove, and the flexible chamber 20 is axially limited by the brake ring 202a and the annular protrusion 202c, which further ensures that the flexible chamber 20 can be in stable contact with the inner wall of the rotary portion 202b after being filled with the cooling medium, so as to perform the functions of heat exchange and cooling. For the generator rotating shaft 202 without the brake ring 202a, a fixing member may be reserved at the rotary portion 202b of the generator rotating shaft 202, to fix a baffle plate, and limit the flexible chamber 20 and the limiting ring 30 in the axial direction.

It can be understood that the flexible chamber 20 may be fixed to the inner wall of the generator rotating shaft 202 by a mechanical fixing member or a support limiting member. When the flexible chamber 20 is filled with the cooling medium, cubical expansion occurs, and the expanded flexible chamber 20 is in direct and close contact with the inner wall of the generator rotating shaft 202. As long as the mechanical fixing member and the support limiting member can meet the above functions, even if the structures thereof are not disclosed, the understanding and implementation of the technical solution will not be hindered.

The flexible chamber 20 in this embodiment is configured to be filled with the cooling medium, so as to cool the generator bearing 203. In this embodiment, the cooling medium is cooling gas flow, which can be obtained by a vortex separator 10 in a specific embodiment. Of course, the cooling gas flow may be gas flow coming from the natural environment outside the wind turbine, and may also be cold gas flow generated by an air refrigeration and conditioning device.

The cooling medium may also be a cooling liquid. In a specific embodiment, the cooling liquid may be the liquid cooled by heat exchange with cold gas flow generated by the vortex separator, so that the liquid can be recycled.

Figure 8:
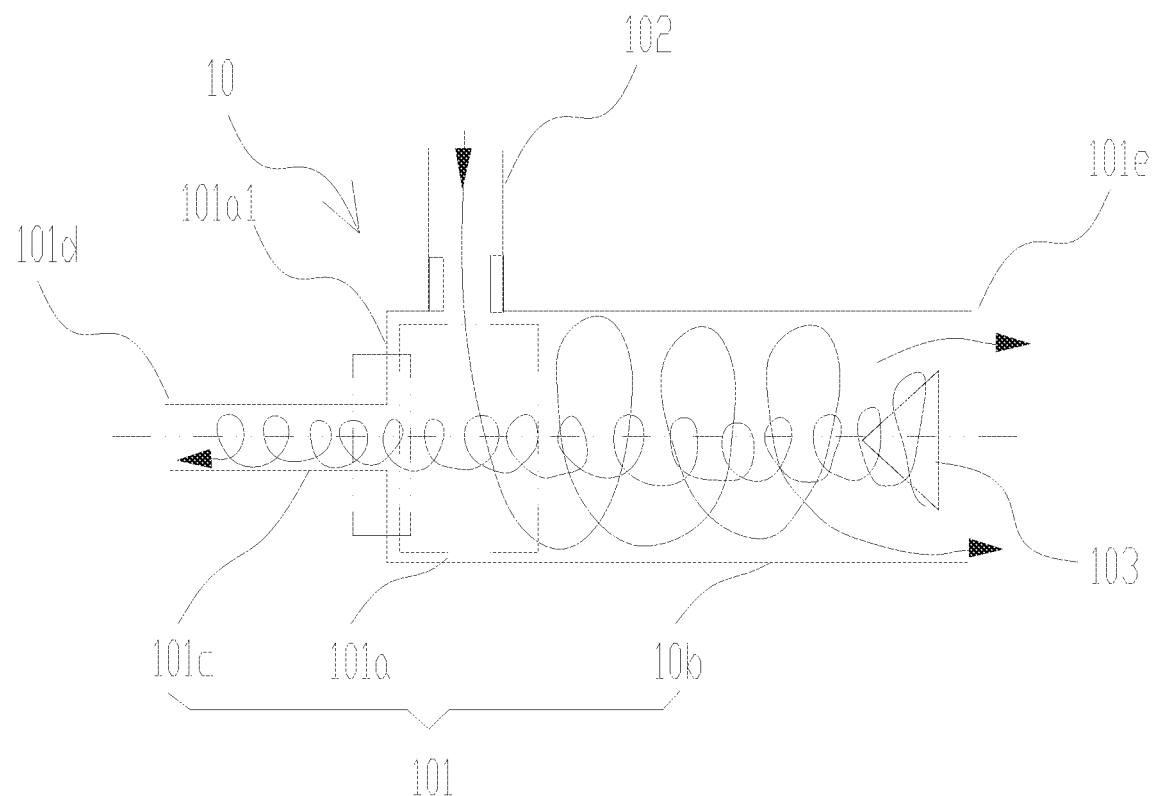
FIG. 8 is a schematic diagram of a vortex separator in FIG. 4.
Figure 9:
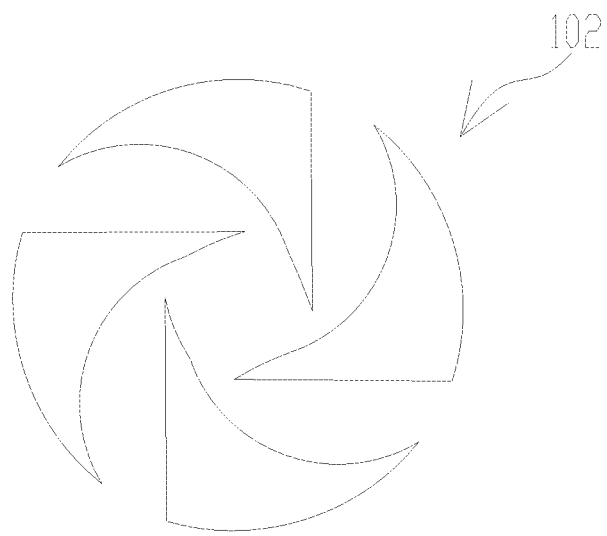
FIG. 9 is a cross-sectional view of a jet pipe in FIG. 8.

With continued reference to FIGS. 4 and 5, and in conjunction with FIGS. 8 and 9, FIG. 8 is a schematic diagram of the vortex separator 10 in FIG. 4, and FIG. 9 is a cross-sectional view of a jet pipe 102 in FIG. 8.

In FIG. 8, the vortex separator 10 includes a jet pipe 102 and a vortex separation tube 101. The jet pipe 102 is connected to a side wall of the vortex separation tube 101 to be in communication with the vortex separation tube 101, and a portion of an inner chamber of the vortex separation tube 101 facing the jet pipe 102 forms a vortex chamber 101a. A cold end pipe section 101c is located at one end of the vortex chamber 101a (a left end in FIG. 8), and a hot end pipe section 101b is located at another end (a right end in FIG. 8). An outlet of the cold end pipe section 101c is a cold end 101d for outputting cold gas flow, and an outlet of the hot end pipe section 101b is a hot end 101e for outputting hot gas flow. An end plate 101a1 located at one end of the vortex chamber 101a is provided with a through hole, which is defined as a cold end orifice plate herein, and the cold end pipe section 101c is in communication with the through hole. As shown in FIG. 8, the cold end pipe section 101c is a relatively thin pipe section with a cross-sectional area smaller than that of the vortex chamber 101a. The vortex chamber 101a and the hot end pipe section 101b have equal diameters, which can be arranged integrally or separately, and the integrated arrangement is simpler.

The jet pipe 102 of the vortex separator 10 is an energy conversion component that converts pressure energy of compressed gas into kinetic energy carried by high-speed gas flow. The jet pipe 102 may include an inlet section, a body section and an outlet section, and the outlet section is provided with a nozzle for jetting gas flow. Spiral gas flow is formed after the gas flow passes through the jet pipe 102, as shown in FIG. 9, a swirl plate is arranged inside the jet pipe 102, that is, the outlet section of the jet pipe 102 is a volute, and after entering the jet pipe 102, the gas flow forms the spiral gas flow to be outputted. The jet pipe 102 is required to be in communication with the vortex chamber 101a tangentially, that is, the spiral gas flow ejected from the jet pipe 102 flows swirlingly into the vortex separation tube 101 in a tangential direction of the vortex separation tube 101. The gas flow can be uniformly distributed to the nozzle at the output section of the jet pipe 102 by the volute, which reduces the energy loss as much as possible, and ensures that the gas flow flows axisymmetrically at an inner circumference of the volute.

Since the cross-sectional area of the cold end pipe section 101c is relatively small, as for the spiral gas flow entering the vortex chamber 101a, resistance at the cold end 101d orifice plate is relatively large, and the gas flow tangentially swirling into the vortex separation tube 101 flows toward the hot end pipe section 101b in an opposite direction of the cold end 101d. Here, a cross-sectional area of the hot end pipe section 101b may be equal to or greater than a cross-sectional area of the vortex chamber 101a, so as to ensure that the spiral gas flow will flow toward the hot end pipe section 101b.

A valve with a cone-shaped surface is further arranged in the hot end pipe section 101b, the valve is specifically embodied as a cone-shaped throttling member 103 as shown in FIG. 6, and a cone-shaped end of the throttling member 103 faces a direction opposite to a flowing direction of the spiral air flow. As shown in FIG. 8, after entering the vortex separation tube 101 from the jet pipe 102, the spiral gas flow flows spirally from left to right, and when the spiral gas flow reaches the throttling member 103, external gas flow of the spiral gas flow can flow out from the valve. That is, the external gas flow flows out through an annular gap between the throttling member 103 and the vortex separation tube 101, and is heated up to become the hot gas flow. As shown in FIG. 8, the hot gas flow flows out from the hot end 101e of the hot end pipe section 101b.

Central gas flow of the spiral gas flow will encounter the throttling member 103, and after colliding with the cone-shaped surface of the throttling member 103, the central gas flow is guided by the cone-shaped surface, to flow swirlingly in an opposite direction to form reflux gas flow. During the above flowing process, it will be cooled down gradually, and a temperature of the cooling gas flow can be greatly reduced to −50 to 10 degrees Celsius. The external gas flow and central gas flow herein are defined with respect to a center line of the spiral gas flow, and the spiral gas flow close to the center line is the central gas flow, while the gas flow away from the center line and close to a radially outermost side of the spiral gas flow is the external gas flow. In order to ensure that the spiral gas flow flows to the hot end pipe section 101b and then flows reversely, so as to form the hot gas flow and cold gas flow, the throttling member 103 may be arranged at a tail end of the hot end pipe section 101b.

In the above technical solution, since it is required that the spiral gas flow can flow reversely after passing through the valve, the cone-shaped throttling member 103 is provided. For forming the reflux spiral gas flow, the valve is only required to have a cone surface within a certain range, for example, it is of a truncated cone shape (that is, a section of a cone without a cone tip), or a half cone formed by cutting a cone along an axial direction. However, it can be understood that, in order to better form a choking effect and better guide the reflux spiral gas flow, it is preferred that the valve is provided to be a complete cone shape as shown in FIG. 8. In addition, an axis of the cone-shaped throttling member 103 coincides with an axis of the cold end pipe section 101c, which facilitates the swirling flow of the gas flow when the reflux spiral air flows swirlingly toward the cold end pipe section 101c, and thereby reducing the energy loss.

It can be seen that, the vortex separator 10 can generate a temperature separation effect that performs temperature separation to a stream of gas flow, to obtain two streams of gas flow, that is, the cold gas flow and the hot gas flow, and an extremely large temperature difference exists between the two streams of gas flow. The vortex separator 10 is developed based on a tornado phenomenon.

Tornado is a strong cyclone phenomenon in nature that occurs under specific atmospheric conditions, and ocean vortex that travels vertically from a water surface to a seabed may also be generated in the ocean under specific atmospheric conditions. The airflow structure of a typical tornado shows that a center of the tornado is a funnel-shaped or trumpet-shaped sharp cone. This cone is a convolution zone of the tornado, and a swirling direction of this cone is the same as that of the rising hot airflow at a periphery which is filled with dust, but an axial flow direction of the airflow in the central cone is opposite to that of the rising airflow at the periphery, and the airflow in the central cone flows downward. Cold airflow in the central cone of the tornado is traced and measured in the natural environment, and a descending speed of the cold airflow can reach 17 m/s. Once a cone tip of the central cone diverges, the tornado will be intensified rapidly, and the cone tip will disappear and become a truncated cone. The hot airflow at the periphery swirls while rises, and when reaching a bottom surface of a cold cloud layer at an upper layer or the stratosphere, it will immediately diverge swirlingly in a flare shape in a horizontal direction and change the swirling direction to be reversely thrown swirlingly. The air swirls rapidly around an axis of the tornado, being drawn due to extreme reduction of an air pressure at the center of the tornado, the airflow is sucked into a bottom of the vortex from all directions in a thin layer of air which is tens of meters thick close to the ground, and then becomes the vortex rotating upward around the axis at a high speed. Therefore, the air in the tornado is always cyclonic, and a central air pressure is 10% lower than a surrounding air pressure, and the central air pressure is generally as low as 400 hPa, and a minimum value is 200 hPa. The tornado has a great sucking effect, which can suck sea water or lake water away from a sea surface or a lake surface, to form a water column to be connected with clouds.

The energy source of the tornado: one energy source is heat energy of the airflow at the periphery of the tornado, and another energy source is vacuum energy in a low pressure area at the center of the vortex. High temperature air of the airflow at the periphery of the tornado interacts with the tornado, causing the thermal energy to be converted into rotational kinetic energy. The mechanism is explained by the Crocco theorem. The Crocco theorem is obtained based on the first law of thermodynamics, that is, conservation of energy, in the fluid vortex field. The theorem quantitatively expresses a relationship between a gradient of thermodynamic enthalpy, a gradient of entropy and swirling intensity of the vortex in the vortex field. Temperature differences and up-down convection in the atmosphere are preconditions for the formation of tornado vortex, and the energy that enhances the tornado vortex comes from the surrounding heat energy. The gradient of the thermodynamic enthalpy formed between the rising hot airflow at the periphery of the tornado and the falling cold airflow at the center of the vortex becomes a key factor for converting atmospheric heat energy into flowing kinetic energy of the vortex. After intensity of the tornado reaches a certain degree with the help of the heat energy, further intensification depends on the vacuum energy in the low pressure area at the center of the vortex. A lower cone at the center of the tornado is in the same swirling direction as the peripheral airflow. The airflow in the lower cone swirls while falling and converges toward the center at the same time. After a centripetal accelerated speed exceeds a certain critical value, the radial convergence process accelerates the swirling of the radial peripheral airflow by viscous diffusion under the action of Coriolis force.

That is, the tornado has a total temperature separation phenomenon. The vortex separator 10 provided in this embodiment is similar to a tornado, and the jet pipe 102 is provided to make the compressed gas flow form spiral gas flow, which can be regarded as a spiral flow of a small-scale tornado. In this way, the total temperature separation of the tornado can be simulated in the vortex separation tube 101, and then the required hot gas flow and cold gas flow can be formed.

The mechanism of this solution is sought from the natural world hereinabove, and the principle of the temperature separation effect of the vortex separator 10 will be described hereinafter.

Figure 10:
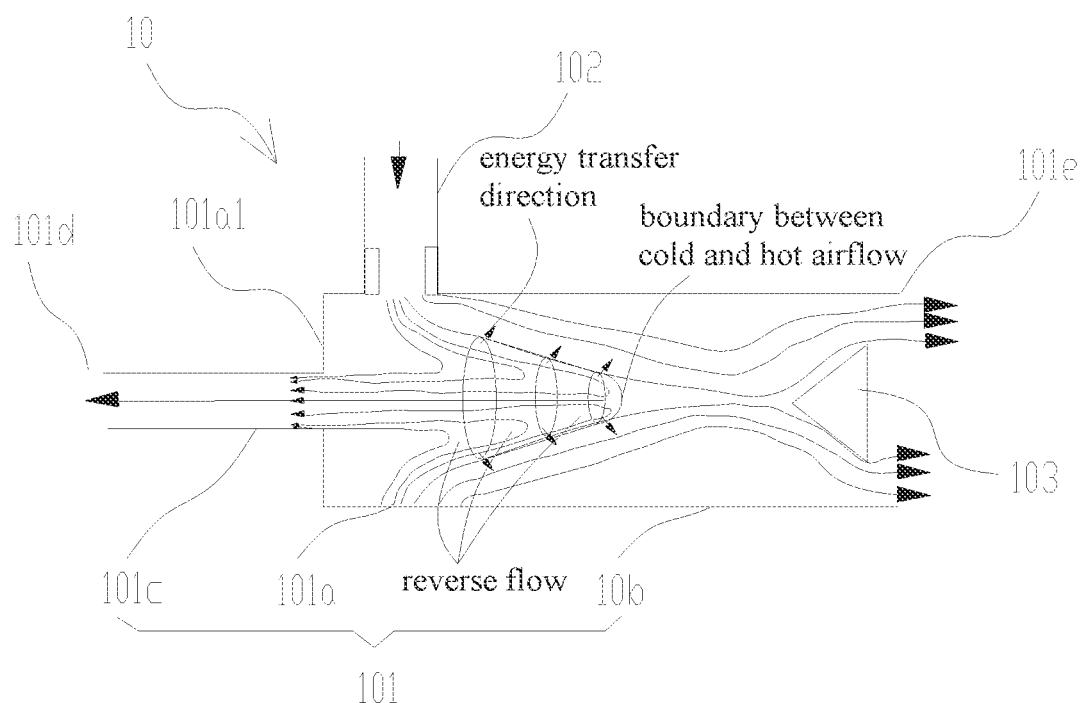
FIG. 10 is a view showing an internal flow field in the vortex separator in FIG. 8.
Figure 11:
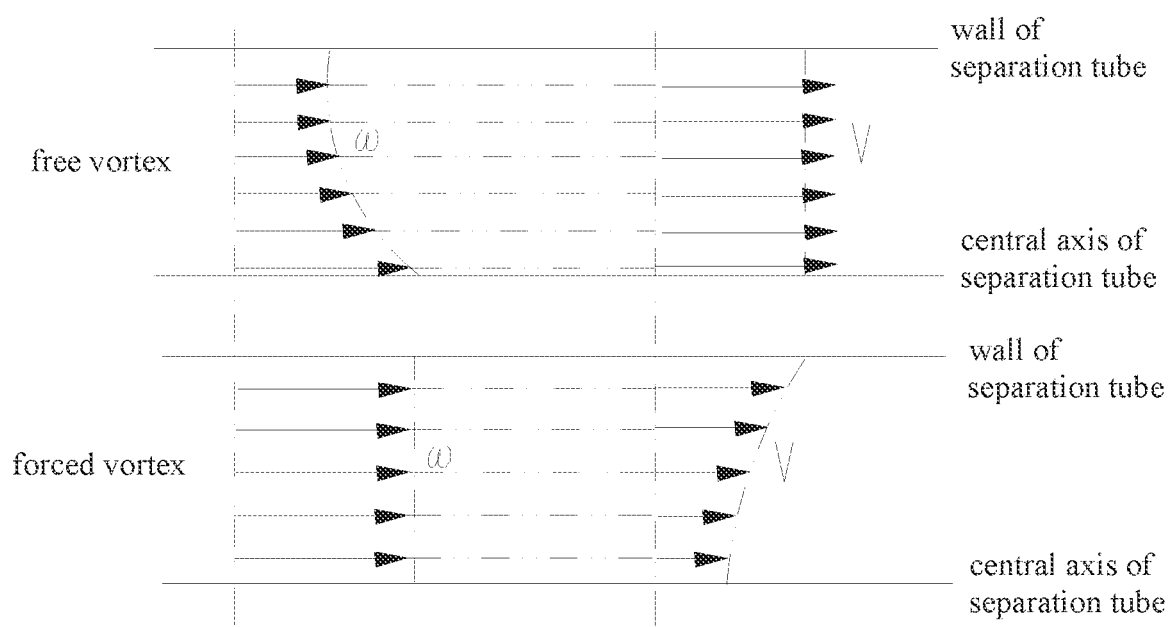
FIG. 11 is a schematic view showing comparison between free vortex and forced vortex.

Referring to FIGS. 10 and 11, FIG. 10 is a schematic view showing an internal flow field inside the vortex separator 10 in FIG. 8; and FIG. 11 is a schematic view showing the comparison between a free vortex and a forced vortex.

According to the law of conservation of energy, the total energy of the cooling gas flow and hot gas flow flowing out of the vortex separator 101 should be equal to the energy of the compressed gas entering the jet pipe 102 of the vortex separator 10 (provided that the vortex separator 10 is well insulated). Therefore, there must be a process of energy redistribution in the vortex separator 10, so that a part of the energy is transferred from the cooling gas flow to the hot gas flow.

First, the compressed gas, hereinafter referred to as the high-pressure gas, is supplied to the jet pipe 102. As shown in FIG. 4, a compressor 70 may be provided, and the compressed gas is supplied by the compressor 70. In order to prevent the provided cooling gas flow from directly entering an internal gap of the generator and affecting an internal environment of the generator 200 (for example, an insulation level may be affected by condensation in the gas flow, causing permanent magnet poles to rust, and the like), a surface heat exchanger may be provided. The cooling gas flow generated by the vortex tube is recycled, and the gas flow at another side of the surface heat exchanger enters the internal gap of the generator under the action of a fan to absorb heat, and then returns to the surface heat exchanger to release heat, thereby realizing recycling.

The compressed gas flow enters the jet pipe 102 of the vortex separator 10 to expand and accelerate. When entering the vortex chamber 101a of the vortex separation tube 101, a speed of the gas flow may approach the speed of sound. In a case that a convergent-divergent jet pipe 102 is employed, the speed of the gas flow will exceed the speed of sound. The rapid expansion of the gas flow in the jet pipe 102 may be approximately considered as an adiabatic process. The speed of the gas flow is very high at the nozzle located at the outlet of the jet pipe 102, and a corresponding thermodynamic temperature of the gas flow at the nozzle is much lower than a temperature of the gas flow at the inlet of the jet pipe 102, that is, a primary temperature drop is performed.

When the gas flow tangentially enters the vortex chamber 101a of the vortex separation tube 101, it will continue to move spirally along an inner wall of the vortex chamber 101a, forming a high-speed swirling gas flow. When the gas flow just flows out of the jet pipe 102, there exists V=const or ω*r=const, where V is a tangential speed of the gas flow, ω is an angular speed around an axis of the vortex, and const is a constant. This kind of swirling is also called the free vortex. As shown in FIG. 11, which shows differences of the tangential speed and the angular speed between the free vortex and the forced vortex. In this case, a moving track of the gas flow in the vortex chamber may be regarded as the Archimedes spiral. The formation process of the cooling gas flow and the hot gas flow is analyzed hereinafter.

The formation of the hot gas flow is as follows. Since the flow of the gas flow just coming out of the jet pipe 102 is the free vortex, the angular speed has a gradient along the radial direction, which causes friction between radial layers of the gas flow, such that an angular speed of the external gas flow of the spiral gas flow is gradually increased, and an angular speed of the central gas flow of the spiral gas flow is gradually decreased. However, due to the fast flow and a short travel distance, the spiral gas flow has not yet reached a full forced vortex, but is developed toward a central portion thereof. The external gas flow of the spiral gas flow moves spirally in the hot end pipe section 101b, which includes both swirling movement and axial movement. During the movement, the external gas flow rubs against an inner wall of the hot end pipe section 101b, thus the speed of the external gas flow becomes lower and lower, the temperature of the external gas flow gradually rises, and the external gas flow finally flows out from the annular gap between the throttling member 103 and the hot end pipe section 101b. A ratio of the cold gas flow to the hot gas flow can be adjusted by adjusting the gap between the throttling member 103 and the hot end pipe section 101b.

The formation of the cold gas flow is as follows. The gas flow is embodied as the free vortex when it just flows out of the jet pipe 102. Under an action of a centrifugal force, and being blocked by the cold end 101d orifice plate of the cold end pipe section 101c, the gas flow will flow, close to the inner wall of the hot end pipe section 101b, toward the throttling member 103. In the flowing process, due to gradual dissipation of an axial speed, the axial speed of the spiral gas flow is close to zero when the spiral gas flow moves to a certain position in the axial direction, and the above position may be defined as a stagnation point. At this time, due to the accumulation of the central gas flow at the stagnation point, a pressure rises continuously, and the pressure at the stagnation point will be higher than a cold end 101d pressure at the outlet of the cold end pipe section 101c, which leads to reverse axial movement in a central area of the hot end pipe section 101b. That is, reflux gas flow starts from the stagnation point, and is gradually cooled down to form the cold gas flow, that is, a secondary temperature drop is performed. At the stagnation point, a total temperature of the external gas flow is higher than that of the central gas flow. In the process of the reverse flow moving towards the cold end pipe section 101c, a portion of the spiral flow at an outer layer is continuously diverted to join the reverse flow, thus the reverse flow gradually expands, and a flow rate of the reverse flow reaches a maximum when the reverse flow reaches the cold end 101d orifice plate.

As shown in FIG. 10, on one cross section of the flow passage of vortex separation tube 101, a static pressure of an outermost layer of the external gas flow is maximum, while a static pressure of innermost gas flow located at a central axis of the central gas flow is minimum. At a cross section near the nozzle of the jet pipe 102, a ratio of the maximum static pressure to the minimum static pressure is the largest, which may reach 1.5 to 2. A static temperature is the highest at a wall of the vortex separation tube 101 and the lowest at the central axis.

On any cross section of the flow passage, a tangential speed of the gas flow at any point is dominant. Near the nozzle of the jet pipe 102, both a radial speed and an axial speed of the gas flow reach a maximum and then gradually decrease in respective directions.

As described above, after leaving the nozzle, the gas flow enters the vortex separation tube 101 in the tangential direction and is divided into two areas. The external gas flow tangentially swirls along the inner wall of the vortex separation tube 101 and toward a hot end 101e outlet of the hot end pipe section 101b, that is, the external gas flow in an outer layer area forms a free vortex. The central gas flow flows back from the position where the throttling member 103 is arranged, due to driving of the surrounding free vortex, and then with the friction, an inner layer area (the central gas flow) where the gas flow swirls like a rigid body is converted into or to be close to a forced vortex.

A boundary between external and central areas, i.e., the external gas flow and the reflux central gas flow, depends on a magnitude of a cold flow rate. The boundary between the cold and hot gas flow can be seen from FIG. 10. In a length of the entire vortex separation tube 101, an interface of the boundary is generally located within a range of 0.65R to 0.75R from the central axis, which is a flow range of the central gas flow in the radial direction, where R is a radius of the vortex separation tube 101. From the nozzle of the jet pipe 102 to the throttling member 103, the external gas flow flows in the axial direction within a range of 0.65R to 1R, which is a flow range of the external gas flow in the radial direction. In the inner area, the central gas flow flows reversely, and the flow starts just from the throttling member 103.

A central temperature of the central gas flow is the highest at the throttling member 103, and gradually decreases in the reverse flow, and the central temperature is the lowest when the central gas flow reaches the cold end 101d orifice plate. A maximum temperature difference occurs in a direction of the central axis, a highest temperature is at a position of the central axis corresponding to the throttling member 103, and a lowest temperature is at a position of the central axis corresponding to the cold end 101d orifice plate. For an inner layer of the central gas flow, that is, the cold gas flow, its static temperature is the lowest at the central axis and the highest at the interface of the boundary between the inner layer and an outer layer of the central flow.

On any cross section of the flow passage of the vortex separation tube 101, the total temperature is the highest near the inner wall surface of the vortex separation tube 101 and the lowest at the central axis. At the cross section of the flow passage at the nozzle, a difference between a wall temperature of the vortex separation tube 101 and a temperature at the central axis of the vortex separation tube 101 reaches the maximum.

Figure 12:
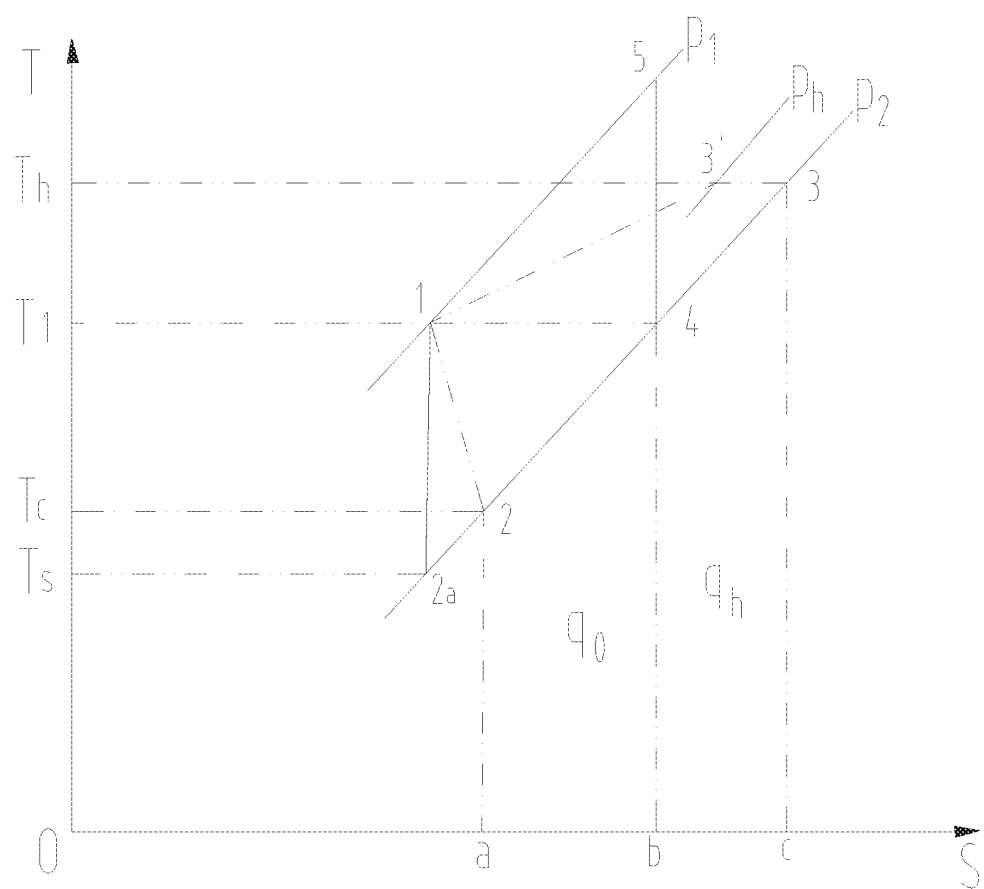
FIG. 12 is a thermodynamic temperature-entropy (T-S) analysis diagram of an operation process inside the vortex separator in FIG. 8.

The total temperature separation effect of the vortex separator 10 may be referred to FIG. 12, which is a thermodynamic temperature-entropy (T-S) analysis diagram of an operation process of the vortex separator in FIG. 8. It can be seen from FIG. 12 that the vortex separator 10 does perform temperature separation to the compressed gas flow entering the jet pipe 102.

In FIG. 12, the abscissa represents entropy, and point 4 shows a state before gas compression, that is, the state before the gas entering the compressor 70. Point 4 to point 5 shows an isentropic compression process of the gas flow from point 4 to point 5. Point 5 to point 1 shows an isobaric cooling process of compressed gas from point 5 to point 1. Point 1 indicates ta state before the compressed gas enters the jet pipe 102 of the vortex separator 10, the compressed gas adiabatically expands to a pressure $P_2$ under ideal conditions, and then the temperature is decreased to $T_s$, that is, a state of point $2a$. Point 2 indicates a state of the cold gas flow flowing out of the vortex tube, and a temperature at point 2 is $T_c$. Point 3 indicates a state of the separated hot gas flow, and a temperature at point 3 is $T_h$. Point 1 to point 2 and point 1 to point 3 are a separation process of the cold gas flow from the state of point 1 to the state of point 2, and a separation process of the hot gas flow from the state of point 1 to the state of point 3, respectively. Point 3 to point 3' is a throttling process of the hot gas flow passing through the throttling member 103 from the state of point 3 to the state of point 3', and an enthalpy value remains unchanged before and after throttling.

During the entire working process, it is impossible for the gas flow to perform isentropic expansion in the jet pipe 102. Due to a certain loss in kinetic energy exchange between the gas flow of inner and outer layers of the vortex chamber 101a, and a heat transfer process toward a center in the vortex chamber 101a, the gas flow is deviated from the adiabatic expansion process in the process from point 1 to point 2. As a result, the temperature $T_c$ of the cold gas flow separated from the vortex separation tube 101 is always higher than the temperature $T_s$ of the cold gas flow under the adiabatic expansion condition.

The cooling effect and heating effect of the vortex separator 10 in the above embodiments are described hereinafter.

During operation, the gas with a temperature $T_1$ is separated into the cold gas flow with the temperature $T_c$ and the hot gas flow with the temperature $T_h$ by the vortex separation tube 101. Therefore, $\Delta T_c = T_1 - T_c$ is called the cooling effect of the vortex separation tube 101, $\Delta T_h = T_h - T_1$ is called the heating effect of the vortex separation tube. $\Delta T_s = T_1 - T_c$ is defined as an isentropic expansion effect, to mark a theoretical cooling effect of the vortex separation tube 101. Therefore, cooling effectiveness of the vortex separation tube 101 is expressed by a cooling efficiency $\eta_c$, that is:

$$\eta_c = \frac{\Delta T_c}{\Delta T_1} = \frac{T_1 - T_c}{T_1\left[1 - \left(\frac{p_2}{p_1}\right)^{\frac{k-1}{k}}\right]}$$

where, $p_1$ is a pressure of the gas flow at the inlet of the vortex separator 10; $p_2$ is a pressure of the gas flow after the gas flow expands in the jet pipe 102 and enters into the vortex chamber 101a; and k is an adiabatic index of the gas (for example, the air).

In addition, there are balances of flow and heat during the operation of the vortex separator 10, which are described as follows.

If flow rates of the high-speed gas flow entering vortex separation tube 101, the cold gas flow at the cold end 101d, and the hot gas flow at the hot end 101e are indicated by $q_{m1}$, $q_{mc}$ and $q_{mh}$, respectively, then $q_{m1} = q_{mc} + q_{mh}$.

If specific enthalpies of the above gas flow are expressed as $h_1$, $h_c$ and $h_h$ (KJ/Kg), respectively, and the kinetic energy when the gas flow flows out is neglected, then $q_{m1}h_1 = q_{mc}h_c + q_{mh}h_h$.

A cold gas flow ratio is:

$$\mu_c = \frac{q_{mc}}{q_{m1}} = \frac{q_{mc}}{q_{mc} + q_{mh}}$$

A corresponding relationship between enthalpy and temperature of the gas is $h = CpT$.

The following formulas are obtained:

$$T_1 = \mu_c T_c + (1 - \mu_c)T_h$$

$$\mu = \frac{T_h - T_1}{T_h - T_c} = \frac{\Delta T_h}{\Delta T_h + \Delta T_c}$$

The refrigerating capacity of the vortex separation tube 101 can also be obtained as follows:

A cooling capacity $Q_0$ (kW) of the vortex separation tube 101 is:

$$Q_0 = q_{mc}c_p(T_1 - T_c) = \mu_c q_{m1} c_p \Delta T_c;$$

then, a cooling capacity per kilogram of the cold gas flow is:

$$q_0 = \frac{Q_0}{q_{mc}} = c_p \Delta T_c$$

where Cp is a specific heat capacity of the gas at a constant pressure; and for each kilogram of high-pressure gas, its unit cooling capacity $q_0'$ may be expressed as:

$$q'_0 = \frac{Q_0}{q_{m1}} = \mu_c c_p \Delta T_c = \mu_c q_0$$

A heating capacity $Q_h$ (kW) of the vortex separation tube 101 is:

$$Q_h = q_{mh}c_p(T_h - T_1) = (1-\mu_c)q_{m1}c_p\Delta T_h;$$

the heating capacity per kilogram of the hot gas flow is:

$$q_h = \frac{Q_h}{q_{mh}} = c_p \Delta T_h;$$

and
for each kilogram of high-pressure gas, its unit heating capacity may be expressed as:

$$q_h = \frac{Q_h}{q_{m1}} = (1 - \mu_c)c_p\Delta T_h.$$

The cooling effect $\Delta T_c = T_1 - T_c$ and the unit cooling capacity $q_0$ of the vortex separation tube 101 are related to following factors, namely, a cold gas flow component $\mu_c$, the working pressure $p_1$ at the inlet of the jet pipe 102, and a water vapor content in the gas flow.

As for the cold airflow component $\mu_c$, when the value of the cold gas flow component changes, both $\Delta T_c$ and $q_0$ change correspondingly, and there are maximum values of $\Delta T_c$ and $q_0$ when $\mu_c$ ranges from 0 to 1. In a case that $\mu_c$ ranges from 0.3 to 0.35, $\Delta T_c$ reaches the maximum value; in a case that $\mu_c$ ranges from 0.6 to 0.7, $q_0$ reaches the maximum value. Moreover, the heating effect also changes with the change of $\mu_c$, $\Delta T_h$ continuously increases with the increase of $\mu_c$ without limitation.

As for the working pressure $p_1$ at the inlet of the jet pipe 102, $p_1$ when increases, both $\Delta T_c$ and $q_0$ increase. However, during increasing, the maximum value of $\Delta T_c$ moves in a direction in which $\mu_c$ decreases, and the maximum value of $q_0$ moves in a direction in which $\mu_c$ increases.

In a case that the gas is moist, water vapor in the cold gas flow is condensed and heat is released, so a cooling temperature rises and the cooling efficiency decreases. A temperature rise of the hot gas flow is reduced and the heating effect is weakened.

The principle of vortex separator 10 is described in detail above, in which the hot gas flow and the cold gas flow can be separated from each other. The cold gas flow may be used as a cooling medium to be introduces into the flexible chamber 20, thus cooling the generator bearing 203. The structure is simple and energy-saving, and it is easy to obtain the required cooling medium to meet the cooling requirements of the generator bearing 203. Furthermore, in this embodiment, a cooling medium obtaining device can be arranged in a small space. In addition, the hot gas flow and the cold gas flow can be separated by the vortex separator 10, to function as a heat source and a cold source at the same time, and there is no need to provide a heat source and a cold source, thereby simplifying the structure and reducing the cost.

With continued reference to FIG. 4, the vortex separator 10 is arranged in a space of a base 1001 of the nacelle 100. For the general wind power generator 200, the space of the base 1001 is dome-shaped, and the space is relatively narrow and small. A tower 600 of the wind turbine is located below the base 1001 and is connected with the base 1001, and a bottom plate 1001a is arranged below the base 1001, to function as a partition between the base 1001 and a top of the tower 600 of the wind turbine. The vortex separator 10 may be placed at the bottom plate 1001aa, to make full use of the space of the base 1001.

In this case, the heat exchange device further includes a fluid slip ring 50. It should be noted that, the fluid slip ring 50 is a rotary component for making flow passages be in communication with each other, which is mainly composed of a stationary portion and a rotary portion. The fluid slip ring 50 is used for fluid transmission between a rotary member and a stationary member. The rotary portion is connected to the rotary member of a device, and the stationary portion is connected to the stationary member of the device.

In the present application, the technical solutions are described by taking a pneumatic slip ring as an example of the fluid slip ring 50. Of course, the fluid slip ring may also be a liquid slip ring. As shown in FIG. 5, the generator fixed shaft 201 is fixed to a fixed support 1004 at an end of the nacelle 100 by fasteners, and the pneumatic slip ring is arranged at a position where the generator fixed shaft 201 and the fixed support 1004 are fixed to each other. The heat exchange device further includes an input pipe 50a and an output pipe 50b which are in communication with the pneumatic slip ring, and the input pipe 50a conveys the cooling gas flow to the flexible chamber 20. As shown in FIG. 8, the flexible chamber 20 is provided with a valve core 20a for introduction of the cold gas flow. In a case that the fluid medium is liquid, the flexible chamber 20 may be provided with valve components, such as check valves, whose functions are similar to those of the valve core 20a. In addition, in order to ensure that the cooling gas flow is continuously introduced into the flexible chamber 20, the heated gas flow, which is the cold gas flow after heat exchange, may flow out through the output pipe 50b. As shown in FIG. 7, the flexible chamber 20 is further provided with a valve core 20a for the output of the gas flow. Specifically, the cold gas flow separated by the vortex separator 10 is conveyed to the flexible chamber 20 through the input pipe 50a, and the heated gas flow after heat exchange of the cold gas flow can flow back to the compressor 70 through the output pipe 50b.

It can be understood that the flexible chamber 20 is not limited to being provided with an outlet and an inlet at the same time. For example, only one valve core may be provided for introducing the cold gas flow into the flexible chamber 20; or the valve core is used as the input and output at the same time, the cold gas flow is inputted first, and after the cold gas flow is heated via heat exchange a certain extent, the heated gas flow is outputted, and then the cold gas flow is inputted again. Of course, it is preferable that the outlet and inlet are arranged separately.

Figure 13:
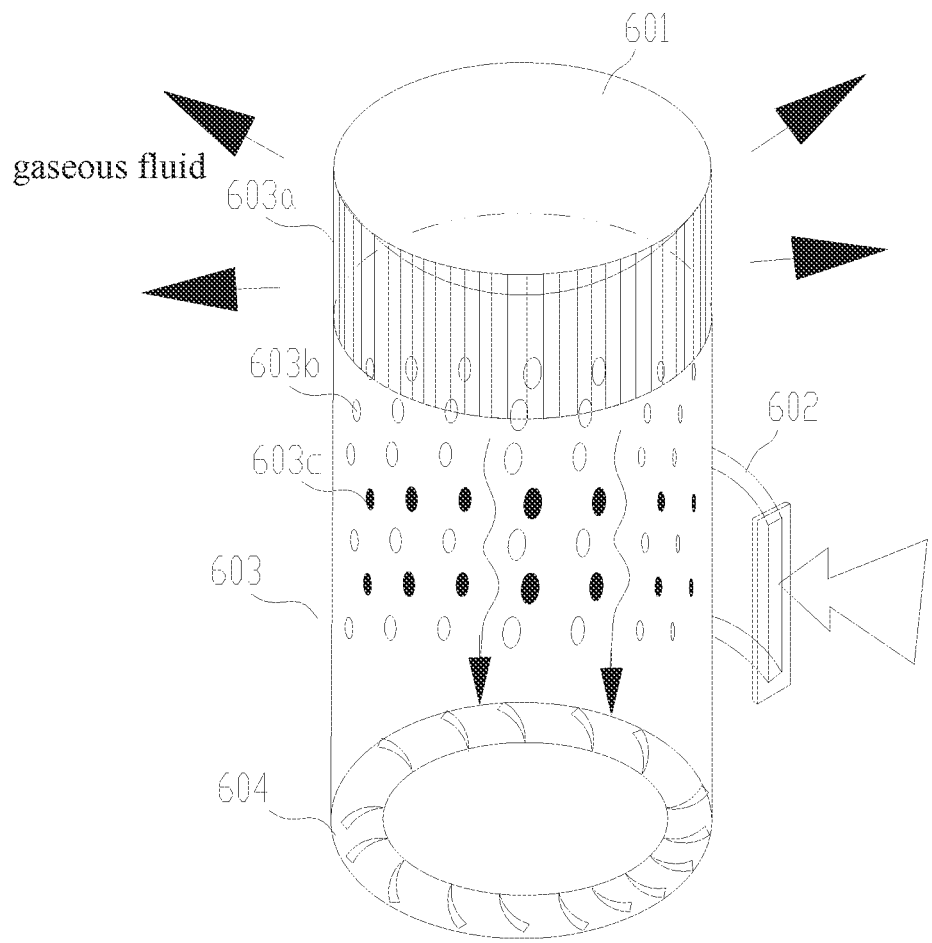
FIG. 13 is a schematic view showing a gas-liquid separator in FIG. 4.
Figure 14:
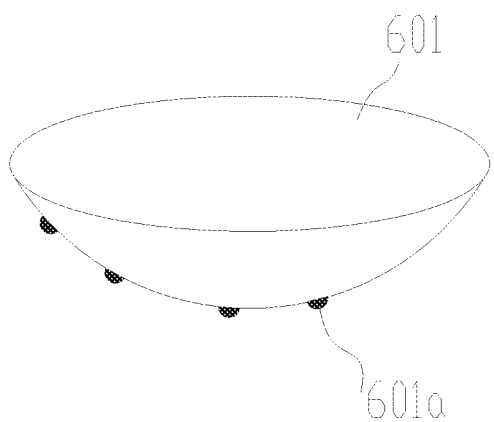
FIG. 14 is a schematic view showing a concave top lid of the gas-liquid separator in FIG. 13.

With reference to FIG. 13, FIG. 13 is a schematic view showing a gas-liquid separator 60 in FIG. 4; and FIG. 14 is a schematic view showing a concave top lid 601 of the gas-liquid separator 60 in FIG. 13.

In order to obtain a drier gas flow, to avoid the influence of the introduction of the cooling gas flow on the inside of the generator 200, the gas-liquid separator 60 may be arranged upstream of the compressor 70.

As shown in FIG. 13, the gas-liquid separator 60 includes a separation cylinder 603 and an inlet end 602 arranged at a side wall of the separation cylinder 603, and the gas flow swirls tangentially into the separation cylinder 603 through the inlet end 602. Multiple protrusions 603b and/or recessions 603c are provided on an inner wall of the separation cylinder 603. After the gas flow swirls tangentially into the separation cylinder 603, growth of a boundary layer of the gas flow is cut off when it passes through the protrusions 603b and/or recessions 603c. When encountering the protrusions 603b, a rotating radius of the gas flow becomes larger, which facilitates gathering of the liquid in the gas flow; and when encountering the recessions 603c, the rotating radius of the gas flow is reduced, and the gas flow is compressed, which is convenient for gaseous moisture to be compressed into liquid and gathered. Finally, the moisture and gaseous fluid in the gas flow are separated, and the liquid water flows down along the inner wall of the separation cylinder 603. An upper portion of the inner wall of the separation cylinder 603 is provided with an opening for the gas flow, from which the liquid has been separated, to flow out, and the outflowing dry gas flow enters the compressor 70. In FIG. 12, the opening is formed by a grille 603a arranged at the upper portion of the inner wall of the separation cylinder 603, and gaps in the grille 603a are embodied as the opening, and the grille 603a may be set as the vertical grille 603a shown in FIG. 12.

Further, the gas-liquid separator 60 may also include a concave top lid 601 arranged at a top of the separation cylinder 603, the concave top lid 601 is recessed toward an inner chamber of the separation cylinder 603, and an inner surface of the concave top lid 601 is provided with multiple protrusions 601a, as shown in FIG. 14, and the inner surface of the concave top lid 601 is the side surface of the concave top lid 601 facing the inner chamber of the separation cylinder 603. When the gas flow swirls tangentially along the separation cylinder 603 for gas-liquid separation, the dry gas flow will rise, but instead of flowing out directly through the opening formed by the grille 603a, part of the gas flow will rise directly to the top of the separation cylinder 603 under the action of the gas pressure. Due to the arrangement of the concave top lid 601, this part of the gas flow will be in contact with the inner surface of the concave top lid 601. Since the inner surface of the concave top lid 601 is provided with the protrusions 601a, with the same principle of gas-liquid separation as described above, the gas flow will perform gas-liquid separation again here, so that the gas flow can be further dried.

As shown in FIG. 13, in order to enable the liquid separated at the inner wall of the gas-liquid separator 60 to quickly flow out, a water guide blade grid 604 is provided at a bottom of the separation cylinder 603. The gas-liquid separator 60 according to this embodiment has a simple structure and a high separation efficiency, so that both the hot gas flow and the cold gas flow separated by the vortex separator 10 are dry gas flow, which is beneficial to maintenance of a dry internal environment of the generator 200 after the gas flow is being introduced into the generator 200. Of course, the gas-liquid separator 60 may also employ other conventional gas-liquid separating structures.

With continued reference to FIG. 4, since the gas flow in the flexible chamber 20 flows back to the compressor 70 after being heated through heat exchange, another gas-liquid separator 60 may further be provided in a flowing path of the gas flow which flows from the output pipe 50b to the compressor 70 through the pneumatic slip ring, that is, further gas-liquid separation may be performed to the returned gas flow.

In this embodiment, in addition to the set of vortex separators 10 arranged in the base 1001 to provide the cooling gas flow for the flexible chamber 20, another set of vortex separators 10 is further provided. As shown in FIG. 5, the another set of vortex separators 10 is provided in the hub 500. The cold gas flow and hot gas flow separated by the another set of vortex separators 10 are distributed as follows: the cold gas flow is conveyed to at least one of the following components through pipelines: a servo controller 503, a pitch bearing 501, a servo motor 502, and the flexible chamber 20, and/or the hot gas flow is conveyed to at least one of the following components through pipelines: a leading edge of the blade 700, a trailing edge of the blade 700, the hub 500, a pitch bearing 501, a wind gauge support 1002 on an upper portion of the nacelle 100, and a yaw bearing 80. As shown in FIG. 4, the yaw bearing 80 is connected between the base 1001 and the tower 600, and a yaw motor 1003 of the yaw bearing 80 is arranged inside the nacelle 100.

Wherein, the purpose of conveying the hot gas flow is to maintain each component at a predetermined temperature, thereby preventing grease from freezing in low-temperature natural environment and preventing blades from freezing and frosting in low-temperature environment. The main function of the cooling gas flow is to absorb the heat generated by the operation of corresponding components, which is determined by a limited value of temperatures of the heat sources regardless of seasons.

As shown in FIG. 5, a branch of the cold gas flow may also enter the flexible chamber 20, to provide the cold gas flow together with the vortex separators 10 arranged in the base 1001. The servo controller 503 is arranged in the hub 500 of the wind power generation equipment, which generally controls pitch regulation, and can also be defined as a pitch control cabinet. In addition, the corresponding servo motor 502 is further provided. The figure shows one servo motor 502 and two servo controllers 503. Actually, three servo controllers 503 and three servo motors 502 are generally arranged in the hub 500 at intervals of 120 degrees in the circumferential direction. The cold gas flow separated by the vortex separators 10 in the hub 500 can be delivered into cabinets of all servo controllers 503 and into the servo motors 502 through pipelines, or at least to one servo controller 503 or one servo motor 502. The servo motors 502 and the servo controllers 503 are both heat sources, and the input of cold gas flow can perform a good cooling function and reduce the thermal load. Moreover, the cold gas flow obviously has a drying function in addition to the cooling function.

In view of this, the cold gas flow may also be divided into other branches to be conveyed to bearings other than the main bearings of the generator, such as the pitch bearing 501 and the yaw bearing 80, so as to perform cooling and drying functions.

The hot gas flow may be delivered to the leading edge and trailing edge of the blade 700 to prevent the blade 700 from freezing and frosting. Specifically, the hot gas flow can be conveyed to an inner chamber of the blade 700 near the leading edge or an outside of the blade, or an inner chamber of the blade 700 near the trailing edge or the outside of the blade. The hot gas flow may be conveyed to the wind gauge support 1002 at the upper portion of the nacelle 100 for drying, so as to keep sensitivity of the detection of the wind gauge support 1002. The hot gas flow may also be conveyed, when the generator 200 is not working, to an exposed surface of the pitch bearing 501 and an inside of the yaw bearing 80, a space inside the hub 500 or other parts, so as to perform the drying function, which does not increase the thermal load of the equipment and can realize unfreezing of grease of the bearings.

Undoubtedly, in order to input the fluid medium into or output the fluid medium from the flexible chamber 20, the flexible chamber must be provided with at least one input/output port for inputting the cooling medium into the flexible chamber 20 and discharging, after the cooling medium absorbs the heat of the generator shaft system and becomes a high-temperature medium, the high-temperature medium out of the flexible chamber. The high temperature mentioned in the present application is relative to the temperature of the fluid medium when it is inputted into the flexible chamber or the temperature of the fluid medium at an initial state, and the temperature of the high temperature medium is higher than the temperature of the fluid medium at the initial state.

Of course, the flexible chamber 20 may be provided with an input port 51a and an output port 51b, the input port 51a is used for inputting the cooling medium into the flexible chamber 20; and the output port 51b is used for discharging, after the cooling medium absorbs the heat of the generator shaft system and becomes the high-temperature medium, the high-temperature medium out of the flexible chamber 20.

The input/output port, the input port, and the output port are not indicated in the figures, which does not affect the understanding and implementation of the technical solutions by those skilled in the art.

In addition, the flexible chamber 20 may also employ a structure of at least two layers, wherein at least one layer adopts a cooling gas flow as the cooling medium, and at least another layer adopts a cooling liquid as the cooling medium.

That is, the flexible chamber 20 may include a first flexible sub-chamber and a second flexible sub-chamber which are in close contact with each other. The first flexible sub-chamber is filled with the cooling liquid which is hermetically stored in the first flexible sub-chamber, and the first flexible sub-chamber is in contact with the inner wall of the generator rotating shaft 202. The second flexible sub-chamber is filled with the cooling gas flow, and the second flexible sub-chamber has an input port 51a and an output port 51b. The cooling gas flow is continuously inputted though the input port 51a of the second flexible sub-chamber, and the hot gas flow, which is formed by the cooling gas flow being heated by absorbing the heat of the first flexible sub-chamber, is continuously outputted through the output port 51b of the second flexible sub-chamber, so as to cool the first flexible sub-chamber.

The specific structures of the first flexible sub-chamber and the second flexible sub-chamber are not limited. It can be understood from the description of the above embodiments that a mounting position of the flexible chamber 20 corresponds to or partially overlaps a mounting position of the generator bearing 203 in the radial direction.

In a case that the vortex separator 10 is arranged in the hub 500, it may be fixed to an inner wall of the hub 500. For example, when manufacturing the hub 500, fixing studs are reserved on the inner wall of the hub 500, and then the vortex separator 10 is fixed to the inner wall of the hub 500 by the studs.

Of course, the cold or hot gas flow conveyed to the hub 500, the pitch bearing 501, the yaw bearing 80, the servo motor 502, the servo controller 503 and the like may also be provided by the vortex separator 10 arranged in the space of the base 1001 of the nacelle 100. However, it can be seen that, the solution that the vortex separator 10 is separately arranged in the hub 500 to generate the cold gas flow to be supplied to the heat sources (the servo controller 503, the servo motor 502, etc.) inside or near the hub 500 is more reliable, which can ensure a sufficient flow rate of the cold gas flow or the hot gas flow. In addition, the cooling gas flow for the flexible chamber 20 and other components mentioned above may also be provided by means other than the vortex separators 10.

As shown in FIG. 4, similar to the background art, a surface heat exchanger 300 may also be provided in the nacelle 100 in this embodiment. The surface heat exchanger 300 is equipped with a driving motor 301 of internal circulation induced draft fan, an internal circulation induced draft fan 302, a driving motor 303 of external circulation induced draft fan and an external circulation induced draft fan 304, and the driving motors of the internal and external induced draft fans are further equipped with frequency converters 40 of driving motors of induced draft fans. The hot gas flow after heat exchange flowing from the iron core 204 of the generator 200 can be introduced into the surface heat exchanger 300 by the internal circulation induced draft fan 302 within a range of 360 degrees, then perform heat exchange with the external cold gas flow introduced by the external circulation induced draft fan 304, and then be conveyed back to the cooling gas flow inlet orifice plate 205 through the conveying pipe 400, to enter the iron core 204 for cooling. The external circulation gas flow after heat exchange is discharged from the air discharge port 305 of external circulation induced draft fan.

As a cooling medium, the cooling gas flow obtained from the surface heat exchanger 300 may be conveyed to the flexible chamber 20, the above pitch bearing 501, the yaw bearing 80, the servo motor 502, the servo controller 503, and the hub 500, etc. In fact, apart from the cooling gas flow, the cooling medium may also be a cooling liquid, and the pneumatic slip ring may accordingly be a liquid slip ring.

In summary, in the embodiment of this solution, the vortex separator 10 is introduced as cold source and heat source equipment, which innovate the protection of the generator shafting, the insulation protection inside the generator (both cold and hot gas flow can play a drying role), and the protection of the servo pitch system (the pitch bearing 501, the servo controller 503, etc.), which is safe and reliable and adaptable to the environment. In the wind turbine, a stack effect of solar radiation absorption by the tower 600 and heat generation by electric cables converges at a pivot link at base 1001, and the heat generation and the corresponding heat dissipation rate are controlled within allowable ranges of life periods of components of the unit. The unit of the wind power generation equipment is no longer required to be equipped with a heat source and a cold source at the same time, instead, one device plays dual functions of the cold source and the heat source at the same time, which is the cold source and also the heat source. It can be seen that the above embodiments relate to the technical field of cooling, drying and energy saving for protection of wind turbines, and in particular to airflow generation, transportation, energy transfer and energy form conversion devices and heat exchange devices required for protection of magnetic poles, armature insulation systems, and bearing lubrication systems of permanent magnet wind turbines.

The above embodiments are only the preferred embodiments of the present application.

It should be noted that, for those skilled in the art, a few of modifications and improvements may be made to the present application without departing from the principle of the present application, and these modifications and improvements are also deemed to fall into the scope of the present application.

The invention claimed is:

1. A system, comprising:
   a generator shaft system, comprising a generator rotating shaft, a generator fixed shaft, and a generator bearing arranged between the generator rotating shaft and the generator fixed shaft; and
   a heat exchange device comprising an expandable chamber into which a cooling medium is allowed to be introduced,
   wherein the expandable chamber is located on an inner wall of the generator rotating shaft, and
   wherein the heat exchange device further comprises a limiting ring, the limiting ring is located at an inner side of the expandable chamber, a radial inner boundary of the expandable chamber is defined by the limiting ring, and the expandable chamber is configured to be inflated and fitted to an inner wall of a rotary portion of the generator rotating shaft after being filled with the cooling medium, or wherein an outer wall of the expandable chamber is provided with an adhesive surface configured to be adhered to the inner wall of the rotary portion.

2. The system according to claim 1, wherein the inner wall of the rotary portion of the generator rotating shaft is annular-shaped, and the expandable chamber is annular-shaped and is arranged on the annular inner wall of the rotary portion of the generator rotating shaft.

3. The system according to claim 1, wherein the limiting ring is formed by splicing at least two limiting ring segments along a circumferential direction, and the limiting ring segments are connected through an expansion hoop.

4. The system according to claim 1, further comprising a fluid slip ring, an input pipe, and an output pipe,
- wherein the input pipe and the output pipe are in communication with the fluid slip ring, and
- wherein the input pipe is configured to convey the cooling medium to the expandable chamber, and the cooling medium in the expandable chamber is outputted through the output pipe.

5. The system according to claim 1, further comprising a vortex separator, the vortex separator comprising a jet pipe and a vortex separation tube, wherein:
- the vortex separation tube comprises a vortex chamber, and a cold end pipe section and a hot end pipe section located at two ends of the vortex chamber respectively;
- the jet pipe is in communication with the vortex chamber, and compressed gas flow forms spiral gas flow through the jet pipe and flows into the vortex chamber in a tangential direction of the vortex chamber;
- a cross-sectional area of the cold end pipe section is smaller than a cross-sectional area of the vortex chamber, and a cross-sectional area of the hot end pipe section is equal to or greater than the cross-sectional area of the vortex chamber;
- a valve having a valve port is arranged inside the hot end pipe section, the valve has a cone-shaped surface, and after the spiral gas flow enters the vortex separation tube, external gas flow of the spiral gas flow is allowed to flow toward the valve port to be gradually heated to become hot gas flow, and then flow out through the valve port;
- central gas flow of the spiral gas flow is allowed to pass by the cone-shaped surface of the valve and flow back to be cooled to become cold gas flow, and then flow out from the cold end pipe section, to serve as the cooling medium to be conveyed to the expandable chamber; and
- the heat exchange device further comprises a compressor, and the compressor is configured to provide compressed gas flow to the vortex separator.

6. The system according to claim 5, wherein one end of the vortex chamber is provided with a through hole, and a pipe body of the cold end pipe section is in communication with the through hole, and the vortex chamber and the hot end pipe section are integrally formed and have equal diameters.

7. The system according to claim 5, wherein the valve comprises a cone-shaped throttling member, a cone-shaped end of the throttling member is arranged to face the cold end pipe section, the throttling member is located at a tail end of the hot end pipe section, an annular gap formed between the throttling member and an inner wall of the hot end pipe section is embodied as the valve port, and an axis of the cold end pipe section coincides with an axis of the throttling member.

8. The system according to claim 5, wherein a gas-liquid separator is arranged upstream of the compressor.

9. The system according to claim 8, wherein the gas-liquid separator comprises a separation cylinder and an inlet end arranged at a side wall of the separation cylinder, and gas flow tangentially flows into the separation cylinder through the inlet end, an inner wall of the separation cylinder is provided with a plurality of protrusions or recessions, and an upper portion of the inner wall of the separation cylinder is provided with an opening for the gas flow to flow out after liquid being separated from the gas flow.

10. The system according to claim 9, wherein the gas-liquid separator further comprises a concave top lid arranged at a top of the separation cylinder, the concave top lid is recessed inwards, an inner surface of the concave top lid is provided with a plurality of protrusions, and a bottom of the separation cylinder is provided with a water guide blade grid.

11. The system according to claim 1, wherein a mounting position of the expandable chamber corresponds to or partially overlaps a mounting position of the generator bearing in a radial direction.

12. The system according to claim 1, wherein
- the expandable chamber is provided with an input port and an output port, the input port is configured for introducing the cooling medium into the expandable chamber, and the output port is configured for discharging, after the cooling medium absorbs heat of the generator shaft system and becomes a high-temperature medium, the high-temperature medium out of the expandable chamber.

13. The system according to claim 1, further comprising at least one of a mechanical fixing member, a support limiting member, or a heat conducting gasket, wherein:
- the expandable chamber is fixed on the inner wall of the generator rotating shaft through the mechanical fixing member or the support limiting member, cubical expansion occurs after the expandable chamber is filled with the cooling medium, and the expandable chamber after cubical expansion is in direct and close contact with the inner wall of the generator rotating shaft; or
- the expandable chamber is fixedly bonded to the inner wall of the generator rotating shaft, and the expandable chamber is in direct and close contact with the inner wall of the generator rotating shaft; or
- the heat conducting gasket is arranged between the expandable chamber and the inner wall of the generator rotating shaft, to make the expandable chamber in indirect and close contact with the inner wall of the generator rotating shaft.

14. The system according to claim 1, wherein:
- the expandable chamber comprises a first expandable sub-chamber and a second expandable sub-chamber which are in close contact with each other;
- the first expandable sub-chamber is filled with a cooling liquid, the cooling liquid is hermetically stored in the first expandable sub-chamber, and the first expandable sub-chamber is in contact with the inner wall of the generator rotating shaft; and
- the second expandable sub-chamber is filled with cooling gas flow, and the second expandable sub-chamber has an input port and an output port, the cooling gas flow is continuously inputted through the input port of the second expandable sub-chamber, and hot gas flow formed by the cooling gas flow absorbing heat of the first expandable sub-chamber is continuously outputted through the output port of the second expandable sub-chamber, to cool the first expandable sub-chamber.

15. A wind turbine, comprising:
- a generator, comprising a rotor, a stator, a generator shaft system, and a heat exchange device,
- wherein the generator shaft system comprises a generator rotating shaft, a generator fixed shaft, and a generator bearing arranged between the generator rotating shaft and the generator fixed shaft,
- wherein the heat exchange device comprises an expandable chamber into which a cooling medium is allowed to be introduced,
- wherein the expandable chamber is located on an inner wall of the generator rotating shaft, and wherein the heat exchange device further comprises a limiting ring, the limiting ring is located at an inner side of the expandable chamber, a radial inner boundary of the expandable chamber is defined by the limiting ring, and the expandable chamber is configured to be inflated and fitted to an inner wall of a rotary portion of the generator rotating shaft after being filled with the cooling medium, or wherein an outer wall of the expandable chamber is provided with an adhesive surface configured to be adhered to the inner wall of the rotary portion.

16. The wind turbine according to claim 15, wherein in a case that the heat exchange device comprises a first vortex separator, The first vortex separator is arranged on a base of the wind turbine, and the base is arranged inside a nacelle; or the first vortex separator is arranged on an inner wall of a tower of the wind turbine.

17. The wind turbine according to claim 16, further comprising a second vortex separator which is arranged on a hub, wherein hot gas flow and cold gas flow of the second vortex separator are distributed as follows:

the cold gas flow is conveyed to at least one of the expandable chamber, a servo controller, a pitch bearing, a servo motor, the hub, and a yaw bearing through pipeline; or the hot gas flow is conveyed to at least one of a leading edge of the blade, a trailing edge of the blade, the hub, the pitch bearing, a wind gauge support on an upper portion of the nacelle, and the yaw bearing through pipeline.

18. The wind turbine according to claim 16, wherein:

cold gas flow is conveyed to at least one of the expandable chamber, a servo controller, a pitch bearing, a servo motor, a hub, and a yaw bearing through pipeline; or hot gas flow is conveyed to at least one of a leading edge of the blade, a trailing edge of the blade, the hub, the pitch bearing, a wind gauge support on an upper portion of the nacelle, and the yaw bearing through pipeline.

19. A generator, comprising:

a generator shaft system, comprising a generator rotating shaft, a generator fixed shaft, and a generator bearing arranged between the generator rotating shaft and the generator fixed shaft; and a heat exchange device comprising an expandable chamber into which a cooling medium is allowed to be introduced, wherein the expandable chamber is located on an inner wall of the generator rotating shaft, wherein the heat exchange device further comprises a limiting ring, the limiting ring is located at an inner side of the expandable chamber, a radial inner boundary of the expandable chamber is defined by the limiting ring, and the expandable chamber is configured to be inflated and fitted to an inner wall of a rotary portion of the generator rotating shaft after being filled with the cooling medium, or wherein an outer wall of the expandable chamber is provided with an adhesive surface configured to be adhered to the inner wall of the rotary portion.

20. The wind turbine according to claim 15, wherein the limiting ring is formed by splicing at least two limiting ring segments along a circumferential direction, and the limiting ring segments are connected through an expansion hoop.

* * * * *